(12) United States Patent
Kato et al.

(10) Patent No.: US 7,053,922 B2
(45) Date of Patent: May 30, 2006

(54) OPTICAL SCANNING APPARATUS, AND IMAGE FORMING APPARATUS USING SUCH OPTICAL SCANNING APPARATUS

(75) Inventors: Manabu Kato, Tochigi (JP); Hiroshi Sato, Tochigi (JP); Hidekazu Shimomura, Kanagawa (JP); Keiichiro Ishihara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 355 days.

(21) Appl. No.: 10/631,781

(22) Filed: Aug. 1, 2003

(65) Prior Publication Data
US 2004/0027446 A1 Feb. 12, 2004

(30) Foreign Application Priority Data
Aug. 8, 2002 (JP) .............................. 2002-231019

(51) Int. Cl.
*B41J 27/00* (2006.01)
(52) U.S. Cl. ....................................... 347/244; 347/258
(58) Field of Classification Search ........ 347/241–244, 347/256–261; 359/563, 668, 205, 708, 206–207, 359/569, 662, 711
See application file for complete search history.

(56) References Cited

U.S. PATENT DOCUMENTS

| 5,557,446 | A | 9/1996 | Kato ........................... 359/206 |
| 5,648,865 | A | 7/1997 | Iizuka ......................... 359/208 |
| 5,966,161 | A | 10/1999 | Kato ........................... 347/258 |
| 5,995,131 | A | 11/1999 | Fujibayashi et al. ......... 347/258 |
| 6,038,053 | A | 3/2000 | Kato ........................... 359/205 |
| 6,094,286 | A | 7/2000 | Kato ........................... 359/206 |
| 6,133,935 | A | 10/2000 | Fujibayashi et al. ......... 347/258 |
| 6,154,245 | A | 11/2000 | Kato ........................... 347/244 |
| 6,166,842 | A | 12/2000 | Aoki et al. .................. 359/205 |
| 6,424,446 | B1 | 7/2002 | Toyoda et al. ............... 359/205 |
| 6,535,317 | B1 * | 3/2003 | Ishibe ......................... 359/205 |
| 6,542,278 | B1 | 4/2003 | Kato ........................... 359/205 |
| 2002/0135848 | A1 * | 9/2002 | Lee ............................. 359/205 |
| 2002/0149668 | A1 | 10/2002 | Kato ........................... 347/244 |
| 2003/0025784 | A1 | 2/2003 | Sato et al. ................... 347/244 |
| 2003/0043442 | A1 | 3/2003 | Ishihara et al. ............. 359/205 |
| 2003/0053185 | A1 | 3/2003 | Shimomura et al. ......... 359/197 |
| 2004/0104994 | A1 | 6/2004 | Ishihara ...................... 347/258 |

FOREIGN PATENT DOCUMENTS

| EP | 730182 A2 * | 9/1996 |
| JP | 7-191272 | 7/1995 |
| JP | 11-237569 | 8/1999 |
| JP | 11-271658 | 10/1999 |
| JP | 2000221434 A * | 8/2000 |

* cited by examiner

*Primary Examiner*—Hai Pham
(74) *Attorney, Agent, or Firm*—Fitzpatrick, Cella, Harper & Scinto

(57) ABSTRACT

An optical scanning apparatus includes a light source unit, a deflecting unit for deflecting and scanning a light beam from the light source unit, and a scanning optical system for scanning the light beam deflected by the deflecting unit on a surface to be scanned. The scanning optical system includes a diffraction portion having an aspherical function in a sub-scanning direction.

17 Claims, 19 Drawing Sheets

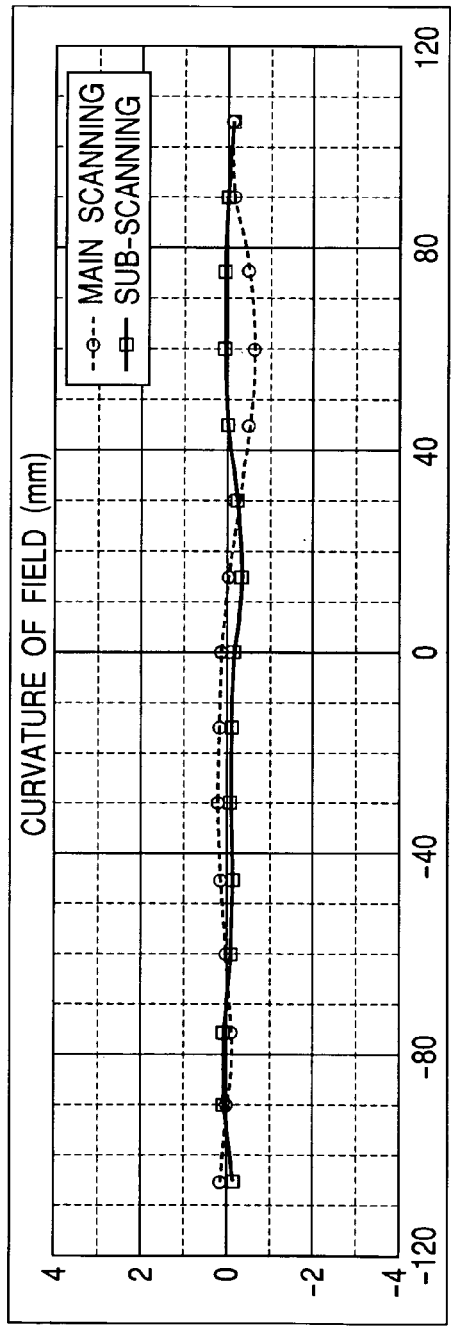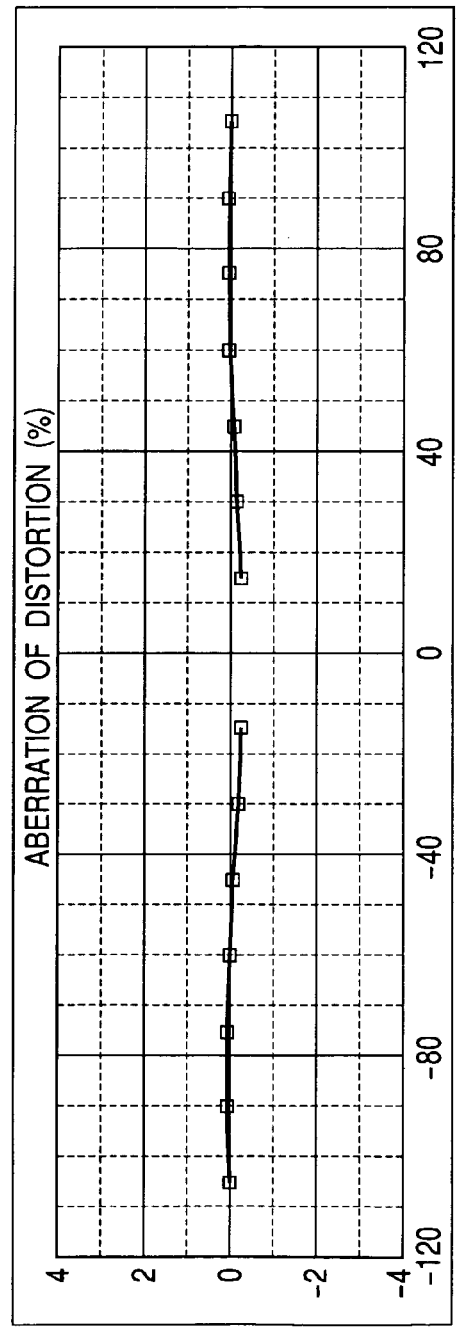

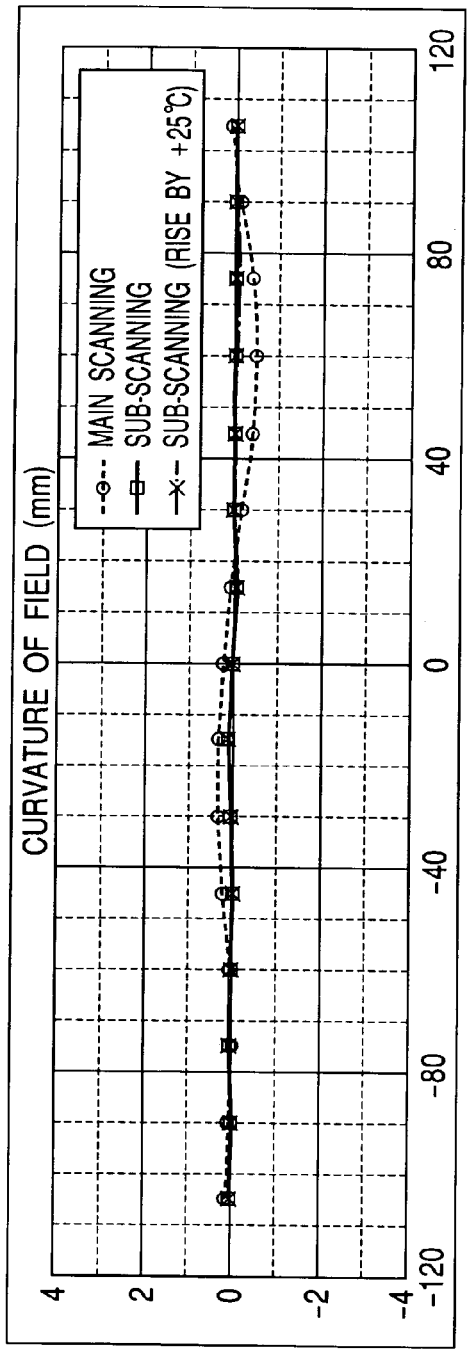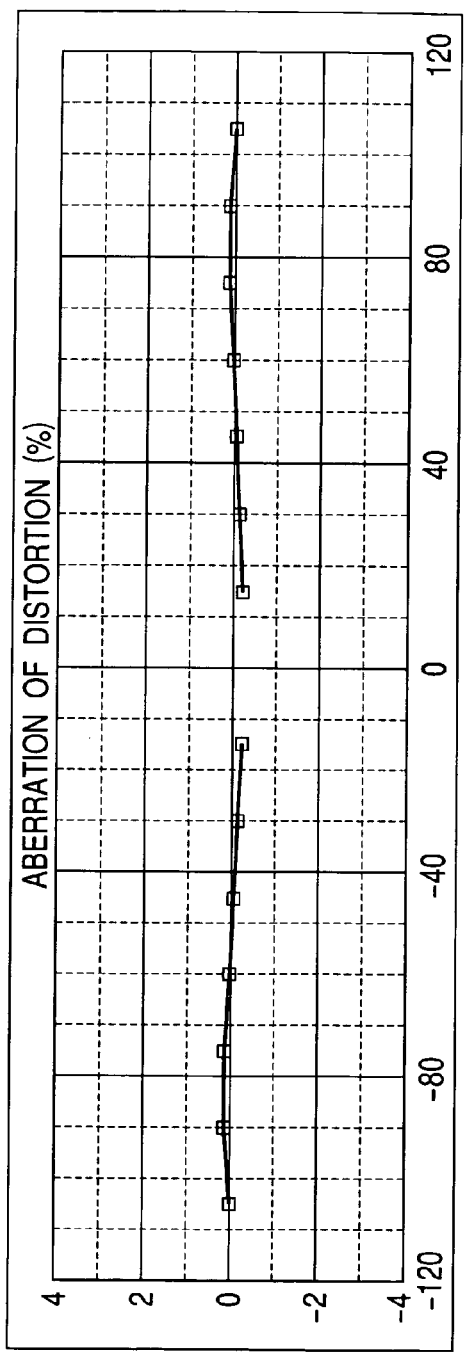

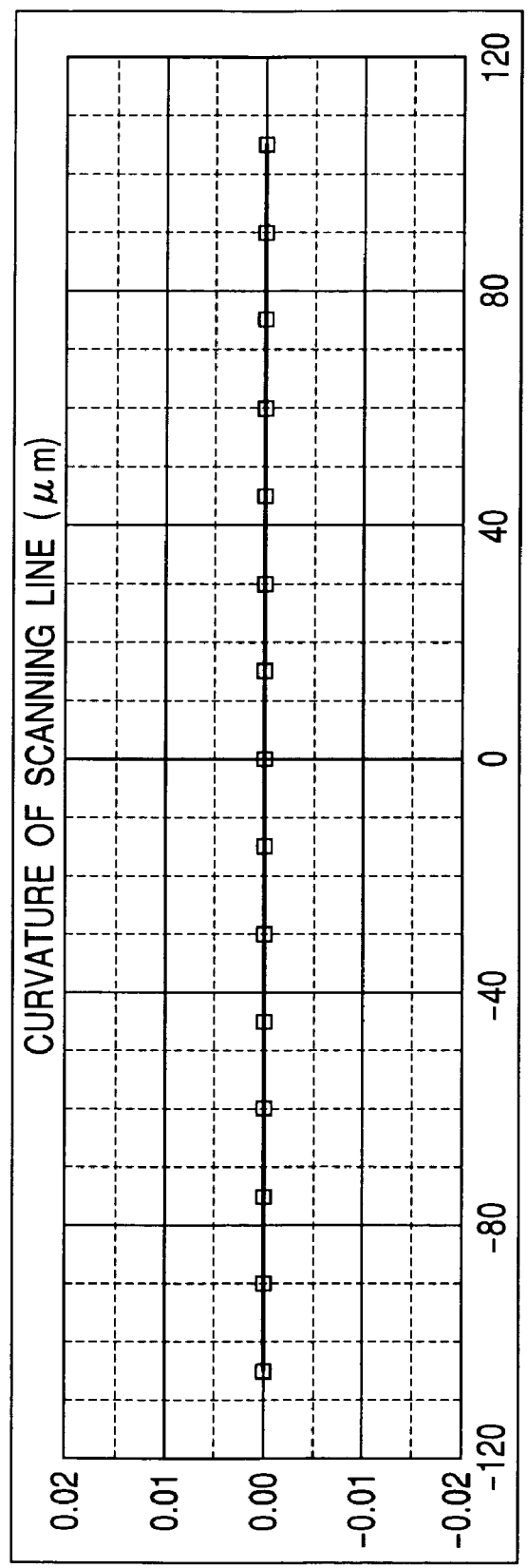

OPTICAL SCANNING APPARATUS, AND IMAGE FORMING APPARATUS USING SUCH OPTICAL SCANNING APPARATUS

BACKGROUND OF THE INVENTION

1. Field of the Invention

The present invention relates to an optical scanning apparatus and an image forming apparatus using such an optical scanning apparatus which are suitably applicable to apparatuses, such as laser beam printers, digital copying machines, and multi-function printers that employ the electrophotographic process, and in which a single or plural modulated light beams from a light source unit is reflectively deflected by a polygon mirror of a deflecting unit, transmitted through a scanning optical system, and scanned on a surface to be scanned (a scanned surface) to record image information, for example.

2. Related Background Art

In a conventional optical scanning apparatus such as a laser beam printer (LBP), a light beam from a light source unit, which is optically modulated according to the image signal, is periodically deflected by a deflecting unit, such as a polygon mirror, is condensed and projected on a surface of a photosensitive recording medium, such as a photosensitive drum, in the form of a spot by a scanning optical system having f-θ characteristics, and is scanned on this surface to record image information.

FIG. 16 illustrates a schematic perspective view illustrating a principal portion of a conventional optical scanning apparatus.

In FIG. 16, a divergent light beam emitted from a light source unit 91 is converted into a nearly parallel light beam by a collimator lens 92, the width of the nearly parallel light beam is restricted by an aperture stop 93, and the light beam is then incident on a cylindrical lens 94 having a predetermined refractive power only in a sub-scanning direction. The nearly parallel light beam incident on the cylindrical lens 94 emerges in the nearly parallel light form in a main scanning section as it is. The light beam is converged in a sub-scanning section, and is focused as an almost linear image on a deflection facet (a reflective facet) 95a of a deflecting unit 95 comprised of a polygon mirror.

The light beam deflected by the deflection facet 95a of the deflecting unit 95 is transmitted through an scanning optical system 96 with the f-θ characteristic, and is projected on a scanned surface (a surface of a photosensitive drum) 98. The deflecting unit 95 is rotated in a direction indicated by an arrow A to optically scan the surface 98 of the photosensitive drum in a direction indicated by an arrow B to record image information thereon.

Further, in an optical scanning apparatus used in a color image forming apparatus, plural light source units are provided, and light beams are incident on a single or plural deflecting units. Here, the plural light beams are incident on the reflective deflection facet at different angles, are transmitted through a single or plural scanning optical systems, and are separated from each other by a mirror or the like. Plural light spots are hence scanned on different surfaces to be scanned.

In those optical scanning apparatuses, the diameter of the spot on the scanned surface needs to be decreased such that highly-precise recording of the image information can be achieved. For the purposes of decreasing the spot diameter, it is important to reduce wave front aberration caused by spherical aberration and the like. In a meridional (meridian) direction corresponding to the main scanning direction, reduction of aberrations is performed by using an aspherical surface, which is conventionally employed. In recent years, also with respect to a sagittal line corresponding to the sub-scanning direction, reduction of aberrations, particularly correction of the spherical aberration, has been proposed as disclosed in Japanese Patent Application Laid-Open Nos. H11-237569 and H11-271658.

It is, however, quite difficult to mold an anamorphic aspherical profile which has different aspherical shapes in both the main scanning direction and the sub-scanning direction. Its measurement and estimation are also difficult to perform.

On the other hand, in an optical scanning apparatus of an oblique-incidence type in which a light beam is obliquely incident on the deflection facet in the sub-scanning section, the deflection facet of the polygon mirror or the like moves back and forth at the time of deflection, and the light beam is incident on such deflection facet forming an angle relative thereto. Hence, a scanning line on the scanned surface is likely to curve.

Particularly, in a color image forming apparatus in which respective optical scanning apparatuses are provided for four photosensitive bodies on each of which a latent image is formed by each laser light, and images of originals of Y (yellow), M (magenta), C (cyan) and Bk (black) are formed on surfaces of corresponding photosensitive bodies, and four images of Y, M, C and Bk formed on the respective photosensitive bodies are superimposed on a transfer medium such as a sheet of paper. Therefore, if curvatures occur in scanning lines of the optical scanning apparatuses provided for the respective photosensitive bodies, deviation appears between the scanning lines of four colors. Chromatic deviation thus occurs in the image on the transfer medium, and quality of the image is likely to be extremely degraded.

For the purposes of solving the above problem, a method of decentering a portion of the scanning optical system in a direction perpendicular to the deflection facet to reduce the curvature of the scanning line is proposed as disclosed in Japanese Patent Application Laid-Open No. H07-191272. However, the following disadvantages exist. Since appearing fashions of the curvature in the scanning lines differ from each other depending on those oblique-incidence and decentering, it is difficult to achieve a complete correction in the entire range of the image. Since rotation of the spot on the scanned surface is remarkable due to the decentering in an scanning optical system wherein imaging in the sub-scanning direction is performed by a magnifying system, the above method can be applied only to an scanning optical system having a substantially reducing system.

SUMMARY OF THE INVENTION

It is an object of the present invention to provide an optical scanning apparatus which is preferably applicable to high precision printing, and in which reduction of a spot diameter due to improvement of imaging performance in the sub-scanning direction, reduction of curvature of the scanning line in an optical scanning apparatus of an oblique-incidence type, and so forth can be achieved, an image forming apparatus using this optical scanning apparatus, and a color image forming apparatus with a reduced chromatic deviation.

According to one aspect of the present invention, there is provided an optical scanning apparatus which includes a light source unit, a deflecting unit for deflecting and scanning a light beam from the light source unit, and a scanning optical system for scanning the light beam deflected by the deflecting unit on a surface to be scanned. The scanning optical system includes a diffraction portion having an aspherical function in a sub-scanning direction.

The aspherical function of the diffraction portion of the scanning optical system in the sub-scanning direction can be continuously changed from an on-axis position to an off-axis position along a main scanning direction. The scanning optical system can be comprised of a single scanning optical element. The scanning optical system can have a function of performing temperature compensation in the sub-scanning direction on an optical axis. The light source unit can include a plurality of radiation points which can be independently modulated. The deflecting unit and the surface to be scanned can be arranged in a conjugate or approximately conjugate relationship with each other in a sub-scanning section.

According to another aspect of the present invention, there is provided an image forming apparatus which includes the above-described optical scanning apparatus, a photosensitive body placed at the surface to be scanned, a developing unit for developing an electrostatic latent image which is formed on the photosensitive body by the light beam scanned by the optical scanning apparatus, as a toner image, a transferring unit for transferring the developed toner image onto a transfer medium, and a fixing unit for fixing the transferred toner image on the transfer medium.

According to still another aspect of the present invention, there is provided a color image forming apparatus which includes at least an optical scanning apparatus described above, a plurality of a photosensitive bodies placed at the surface to be scanned, a plurality of developing units for developing an electrostatic latent image which is formed on the photosensitive body by the light beam scanned by the optical scanning apparatus, as a toner image, a transferring unit for transferring the developed toner image onto a transfer medium, and a fixing unit for fixing the transferred toner image on the transfer medium.

According to still another aspect of the present invention, there is provided the above-described image forming apparatus, and a printer controller for converting code data input from an external apparatus into image signal to supply the image signal to the optical scanning apparatus.

According to still another aspect of the present invention, there is provided an optical scanning apparatus which includes a light source unit, a deflecting unit for deflecting and scanning a light beam from the light source unit, and a scanning optical system for scanning the light beam deflected by the deflecting unit on a surface to be scanned. In this optical scanning apparatus, the light beam from the light source unit is incident on a deflection facet of the deflecting unit at an angle relative to the deflection facet, and the scanning optical system includes a diffraction portion having an aspherical function in a sub-scanning direction.

In this optical scanning apparatus, curvature of a scanning line on the surface to be scanned, which occurs by causing the light beam to be incident on the deflection facet at an angle relative to the deflection facet in a sub-scanning section, can be corrected in the scanning optical system.

According to still another aspect of the present invention, there is provided an image forming apparatus which includes the above-described optical scanning apparatus of an oblique-incidence type, a photosensitive body placed at the surface to be scanned, a developing unit for developing an electrostatic latent image which is formed on the photosensitive body by the light beam scanned by the optical scanning apparatus, as a toner image, a transferring unit for transferring the developed toner image onto a transfer medium, and a fixing unit for fixing the transferred toner image on the transfer medium.

According to still another aspect of the present invention, there is provided a color image forming apparatus which includes at least an optical scanning apparatus of an oblique-incidence type described above, a plurality of a photosensitive bodies placed at the surface to be scanned, a plurality of developing units for developing an electrostatic latent image which is formed on said photosensitive body by the light beam scanned by the optical scanning apparatus, as a toner image, a transferring unit for transferring the developed toner image onto a transfer medium, and a fixing unit for fixing the transferred toner image on the transfer medium.

According to still another aspect of the present invention, there is provided an image forming apparatus which includes the above-described optical scanning apparatus of an oblique-incidence type, and a printer controller for converting code data input from an external apparatus into image signal to supply the image signal to the optical scanning apparatus.

These and further aspects and features of the invention will become apparent from the following detailed description of preferred embodiments thereof in conjunction with the accompanying drawings.

BRIEF DESCRIPTION OF THE DRAWINGS

FIGS. 5A, 5B and 5C are charts showing geometrical aberrations of the first embodiment, respectively;

FIGS. 9A, 9B and 9C are charts showing geometrical aberrations of the second embodiment, respectively;

DESCRIPTION OF THE PREFERRED EMBODIMENTS

First Embodiment

Figure 1:
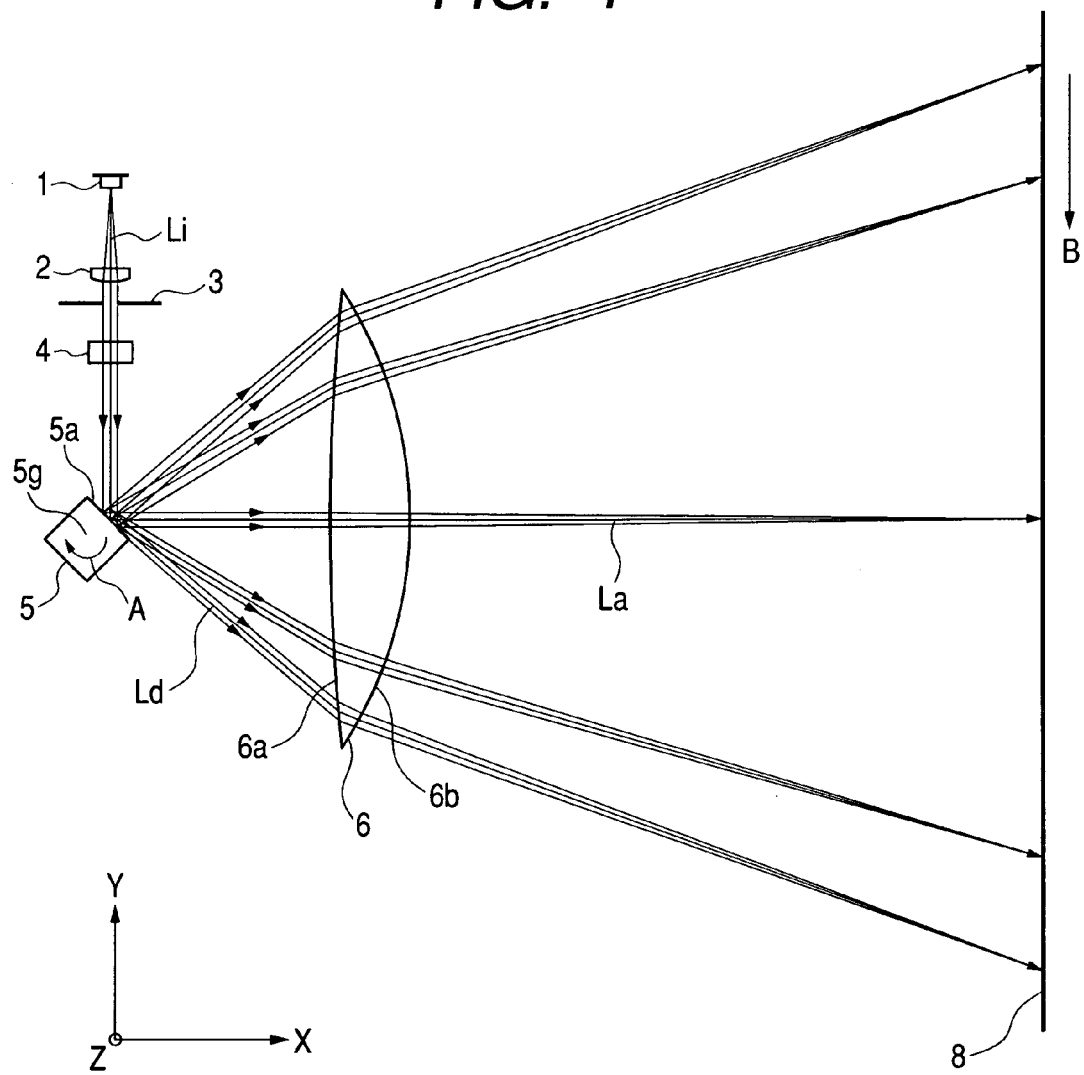
FIG. 1 is a cross-sectional view in a main scanning direction illustrating an optical scanning apparatus of a first embodiment according to the present invention.
Figure 2:
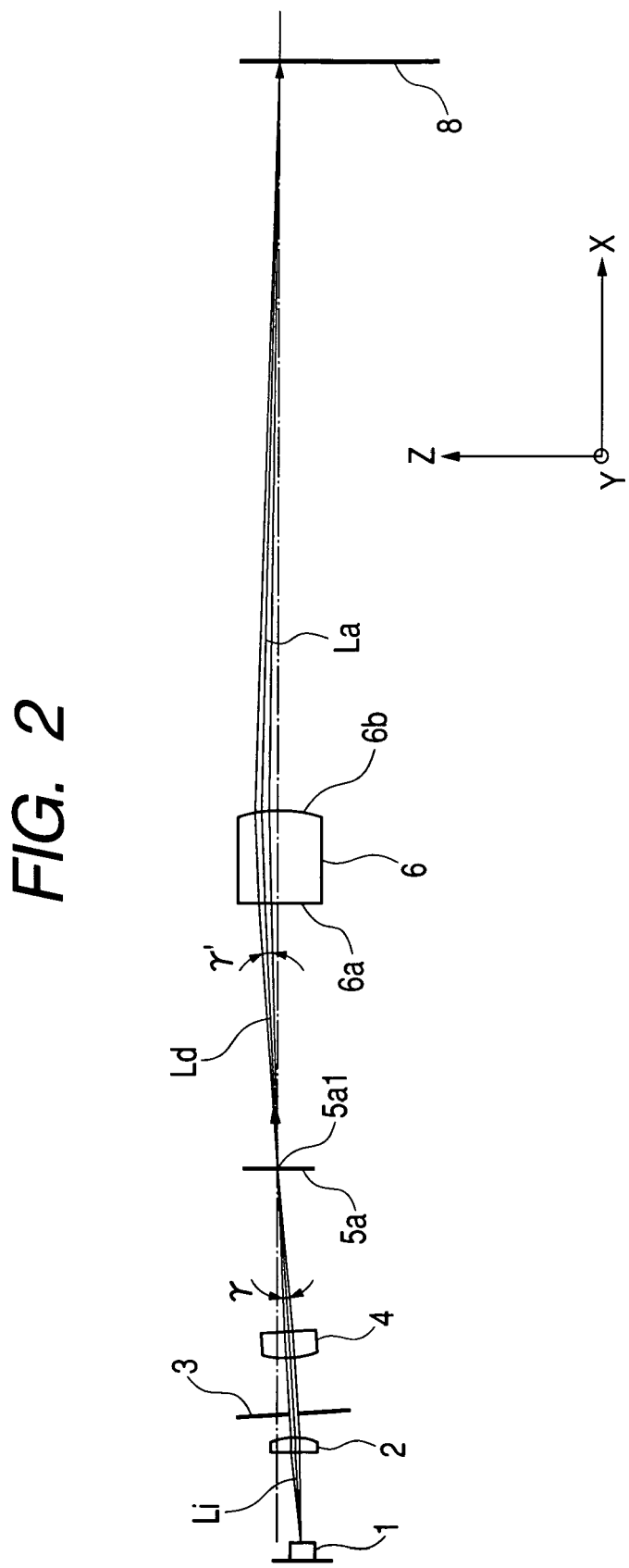
FIG. 2 is a cross-sectional view in a sub-scanning direction of the first embodiment.

FIG. 1 is a cross-sectional view in a main scanning direction illustrating a main portion of an optical scanning apparatus of a first embodiment according to the present invention, and FIG. 2 is a cross-sectional view in a sub-scanning direction illustrating the main portion of the first embodiment, in which an optical path in the sub-scanning direction is developed.

Here, the main scanning direction designates a direction perpendicular to a rotation axis of a deflecting unit and an optical axis of a scanning optical system (i.e., a direction along which a light beam is reflectively deflected (deflection-scanned) by the deflecting unit, and the sub-scanning direction designates a direction parallel to the rotation axis of the deflecting unit. Further, a main scanning section designates a plane parallel to the main scanning direction and including the optical axis of the scanning optical system. A sub-scanning section designates a plane perpendicular to the main scanning section.

In FIGS. 1 and 2, reference numeral 1 represents a light source unit comprised of a semiconductor laser, for example. Reference numeral 2 represents a collimator lens (a first optical element). Reference numeral 3 represents a stop for restricting a light beam (the amount of light). Reference numeral 4 represents a cylindrical lens (a second optical element). Reference numeral 5 represents an optical deflector (a deflecting unit) comprised of a polygon mirror which is rotated in a direction of an arrow A about its rotation axis 5g by a driving unit (not shown) such as a motor. Reference numeral 6 represents a scanning optical system which has the f-θ characteristic, and consists of a single scanning optical element. Reference numeral 8 represents a surface of a photosensitive drum, which is a surface to be scanned.

In the first embodiment, a divergent light beam Li emitted from semiconductor laser 1 of a light source unit is converted into a nearly parallel light beam (it can be a convergent light beam, or a divergent light beam) by the collimator lens 2. The light beam is limited by the stop 3 in the amount of light, and is then incident on the cylindrical lens 4. Here, the light beam in the main scanning direction is incident on the polygon mirror 5 of a deflecting unit as it is, while the light beam in the sub-scanning direction is imaged on a place close to a deflection facet 5a of the polygon mirror 5 by the cylindrical lens 4. The light beam incident on the polygon mirror 5 is hence converged into an image elongate in the main scanning direction.

The light beam entering the polygon mirror 5 is incident on the deflection facet 5a at an angle γ relative thereto, and is deflected and scanned toward the scanning optical system 6 when the polygon mirror 5 is rotated in the direction of arrow A by the motor (not shown). The light beam is then incident on the scanning optical system 6 having the f-θ characteristic. The scanning optical system 6 is comprised of a single toric lens (a scanning optical element) having different refractive powers in the main scanning direction and the sub-scanning direction, respectively. Accordingly, a deflected light beam Ld from the polygon mirror 5 is imaged on the scanned surface 8 as a spot, and the fall or inclination of the reflective deflection facet 5a is compensated for. Further, the scanning optical system 6 has a diffraction portion on at least one surface thereof, and the diffraction portion has an aspherical function at least in a sagittal direction corresponding to the sub-scanning direction. The light beam incident on the scanning optical system 6 is imaged on the scanned surface 8, such as a photosensitive drum, by the scanning optical system 6, and is scanned on this scanned surface.

Shapes of refractive surfaces 6a and 6b of the scanning optical system 6 in the first embodiment are represented by the following relations.

Figure 3:
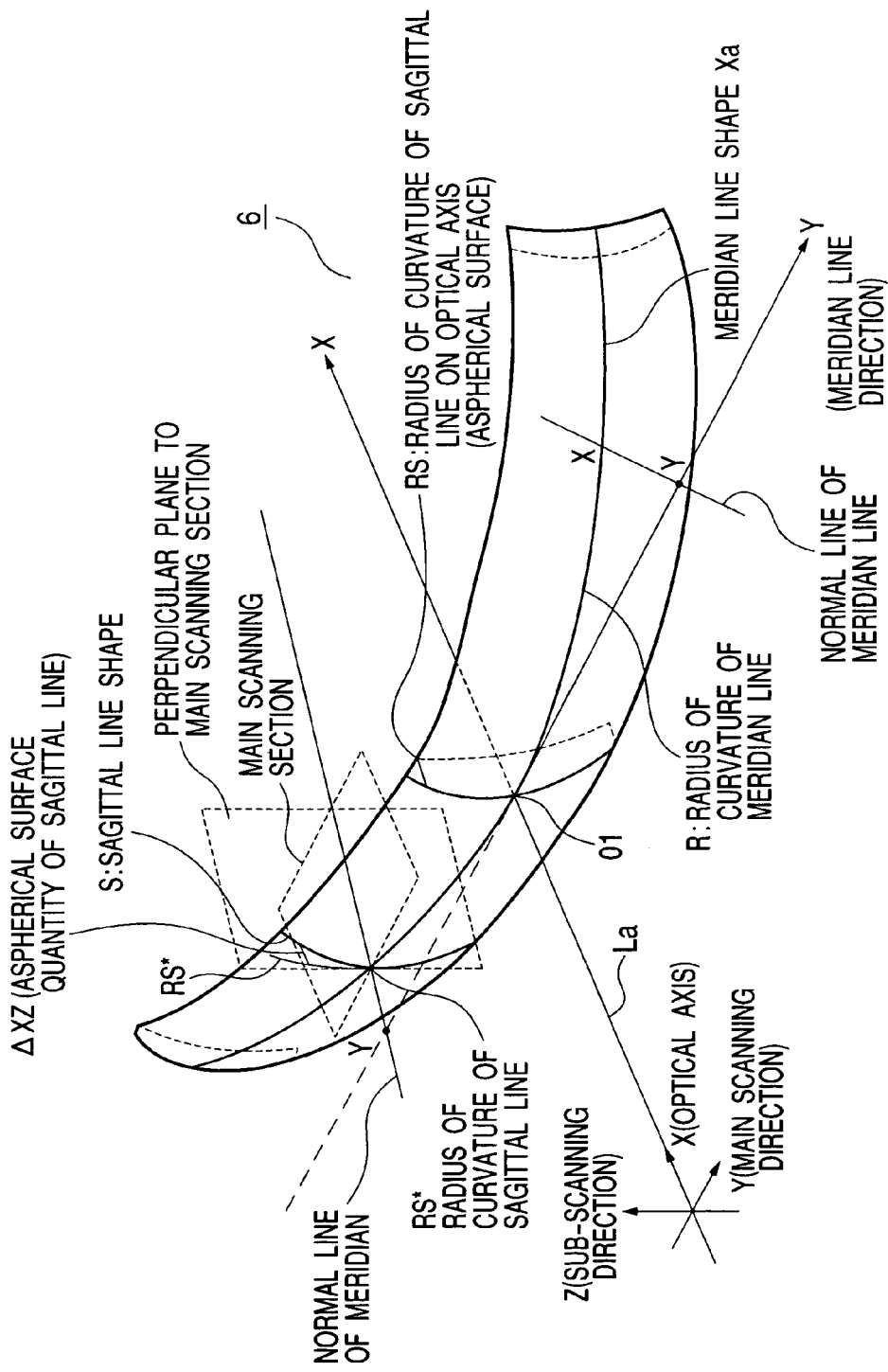
FIG. 3 is a schematic view illustrating various planes and directions in the first embodiment.

As illustrated in FIG. 3, the meridional direction corresponding to the main scanning direction is written as $$Xa = (Y^2/R)/\{1+(1-(1+K)(Y/R)^2)^{1/2}\} + B_4Y^4 + B_6Y^4 + B_8Y^8 + B_{10}Y^{10}$$

where an intersection between the refractive surface and the optical axis La is an origin O1, a direction of the optical axis is an x-axis, an axis perpendicular to the optical axis La in the main scanning plane is a y-axis, and an axis perpendicular to the optical axis La in the main scanning plane is a y-axis, an axis perpendicular to the optical axis La in the sub-scanning plane is a z-axis, R is the radius of curvature of paraxial meridional line, and K, $B_4$, $B_6$, $B_8$ and $B_{10}$ are aspherical coefficients.

The sagittal direction corresponding to the sub-scanning direction (a direction perpendicular to the main scanning direction and including the optical axis) is written as $$S = (Z^2/Rs')/\{1+(1-(Z/Rs')^2)^{1/2}\}$$

where $Rs' = Rs(1+D_2Y^2+D_4Y^4+D_6Y^6+D_8Y^8+D_{10}Y^{10})$ radius of curvature of sagittal line, and $D_2$, $D_4$, $D_6$, $D_8$ and $D_{10}$ are coefficients. S represents a sagittal shape defined in a plane including a line normal to the meridional line at each position in the meridional direction and perpendicular to the main scanning direction (the x-y plane). Although polynominals of the above relations are expressed by terms up to the 10-th order, these relations can be expressed by terms up to more than or less than this order.

The diffraction surface in the first embodiment is given by a shape that is established by adding a diffraction grating obtained by the following phase function to the above-discussed base refractive surface.

$$\emptyset = m\lambda = b_2Y^2 + b_4Y^4 + b_6Y^6 + b_8Y^8 + b_{10}Y^{10} + (d_0+d_2Y^2+d_4Y^4)Z^2 + (\theta_0+\theta_2Y^2+\theta_4Y^4)Z^4$$

Where m is the order of diffraction, and +1-st order diffraction light is used in first to third embodiments.

In the above formulae, orders in the aspherical expression and the phase function are limitedly described, but these orders are not limited in the diffraction surface in the first embodiment. As the order increases, the degree of design freedom increases and aberrations are reduced.

Figure 4:
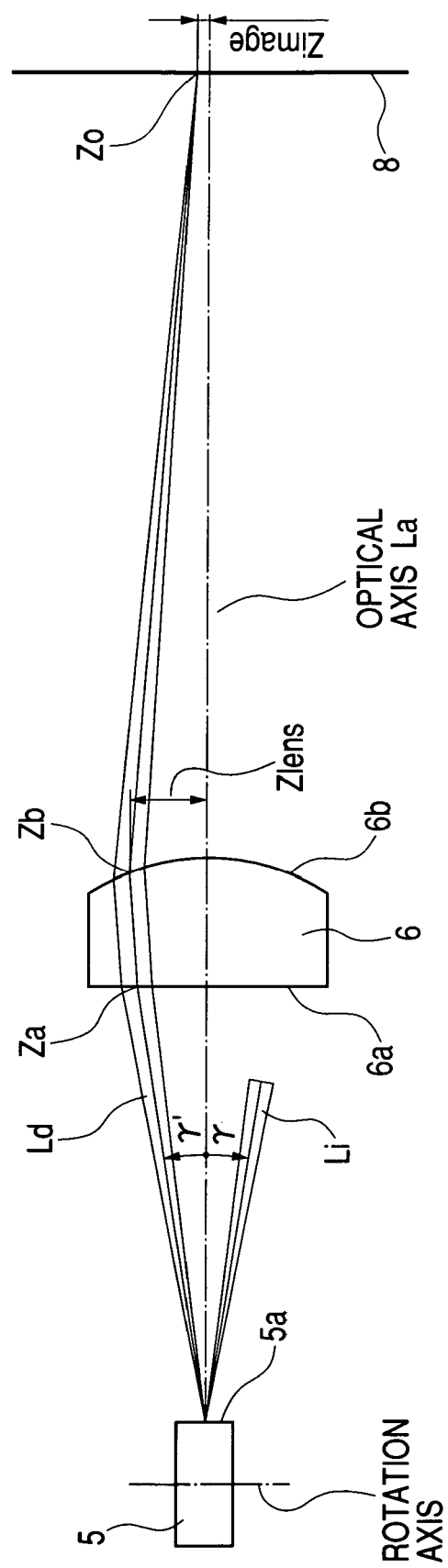
FIG. 4 is a cross-sectional enlarged view in the sub-scanning direction illustrating an optical. path from a polygon mirror to a surface to be scanned in the first embodiment.

FIG. 4 is an enlarged view illustrating the optical path from the polygon mirror 5 to the scanned surface 8 in the sub-scanning direction in the first embodiment. Design values of the first embodiment are described in the following Table 1. In values in Table 1, notations "E+Z" and "E−Z" mean $\times 10^Z$ and $\times 10^{-Z}$, respectively. These notations hold in Tables 2 and 3 later described.

TABLE 1

First embodiment
Design data

| wavelength, refractive index | | | surface shape of toric lens (main scanning direction) | | | surface shape of toric lens (sub-scanning direction) | |
|---|---|---|---|---|---|---|---|
| wavelength used | λ (nm) | 780 | | first surface | second surface | | first surface | second surface |
| toric lens, refractive index | nd | 1.53064 | R | 4.27400E+02 | −9.47135E+01 | r | ∞ | −2.33532E+01 |
| toric lens, Abbe's number | νd | 55.5 | K | 3.71366E+00 | | D2s | | 6.83645E−05 |
| light beam angle | | | B4 | −1.85091E−07 | | D4s | | −3.15441E−09 |
| polygon incident angle (main scanning) | αm | 90.0 | B6 | 3.44576E−11 | | D6s | | 1.57399E−12 |
| polygon incident angle (sub-scanning) | γ | 3.0 | B8 | −6.82420E−15 | | D8s | | 3.94658E−16 |
| polygon maximum emitting angle | θe | 40.1 | B10 | 7.10650E−19 | | D10s | | −1.68727E−19 |
| arrangement | | | | | | D2e | | 6.94333E−05 |
| polygon facet-toric lens | e1 | 51.6 | | | | D4e | | 8.35960E−09 |
| center thickness of toric lens | d1 | 17.9 | | | | D6e | | −3.37599E−12 |
| toric lens-scanned surface | e2 | 147.3 | | toric lens phase function | | D8e | | 7.98617E−16 |
| | | | | first surface | second surface | D10e | | −3.290990E−20 |
| | | | b2 | | d0 | | | |
| Suffix s; laser side | | | b4 | | d2 | | | |
| Suffix e; opposire to laser side | | | b6 | | d4 | | | |
| | | | b8 | | e0 | | 4.40863E−06 | |
| | | | b10 | | e2 | | −7.29715E−10 | |
| | | | | | e4 | | | |

In the first embodiment, as illustrated in FIG. 4, the input light beam Li emitted from the light source unit 1 enters the reflective deflection facet 5a of the deflecting unit 5 at an angle of γ=3 (degrees) relative to the main scanning section in the sub-scanning direction. Further, the deflected light beam Ld also enters the scanning optical system 6 at an angle of γ'=3 (degrees) relative to the main scanning section in the sub-scanning direction. Therefore, the principal ray (alternate long and two short dashes line) of the deflected light beam Ld reaches at positions quite away from the sagittal optical axis (or the meridional line) on light incidence surface 6a and light emerging surface 6b of the scanning optical system 6. Passing positions Za and Zb on the lens surfaces 6a and 6b are above the meridional position (Zlens=0), and their distances Zlens from the optical axis La are Zlens>>0. The deflected light beam Ld transmitting through the scanning optical system 6 is imaged on a point Zo of the scanned surface 8, whose distance from the optical axis is Zimage, by the light condensing function of the scanning optical system 6.

When the principal ray of the deflected light beam Ld passes the positions away from the sagittal optical axis (or the meridional line) La, the light beam through the scanning optical system 6 is directed downward by the power (refractive power) of the lens 6, intersects the sagittal optical axis La before the scanned surface 8, and reaches a position below the main scanning section on the scanned surface 8. The position of the scanned surface 8 in the sub-scanning direction, at which the deflected light beam Ld arrives, will be referred to as an irradiation position Zo.

In general, positions in the sub-scanning direction on the lens surfaces 6a and 6b of the scanning optical system 6, at which the deflected light beam Ld arrives, and the power (refractive power) capable of directing downward the deflected light beam Ld transmitted through the scanning optical system 6 vary depending on the image height. Therefore, the irradiation positions Zo do not align with each other, and the scanning line is liable to curve.

In the first embodiment, for the purposes of solving the above problem, the light incidence surface 6a of a scanning optical element in the scanning optical system 6 is shaped into a toric surface whose meridional direction is aspherical, and the diffraction portion (diffraction grating) with an aspherical function (aspherical term) in the sagittal direction is formed on the light emerging surface 6b which is also shaped into a toric surface. The diffraction grating in the first embodiment has power only in the sagittal direction, and its aspherical quantity changes from that on the optical axis La along the meridional direction of the scanning optical system 6.

The power for directing downward the deflected light beam Ld transmitted through the scanning optical system 6 can be varied by the aspherical component of the diffraction grating, and hence the irradiation position Zo on the scanned surface 8 can be controlled. Further, the irradiation positions Zo for respective image heights are aligned with each other by changing the aspherical quantity along the meridional direction. In other words, correction is made to the curvature of the scanning line on the scanned surface 8 which is likely to be generated by causing the light beam to enter the deflection facet at an angle relative thereto.

Figure 5C:
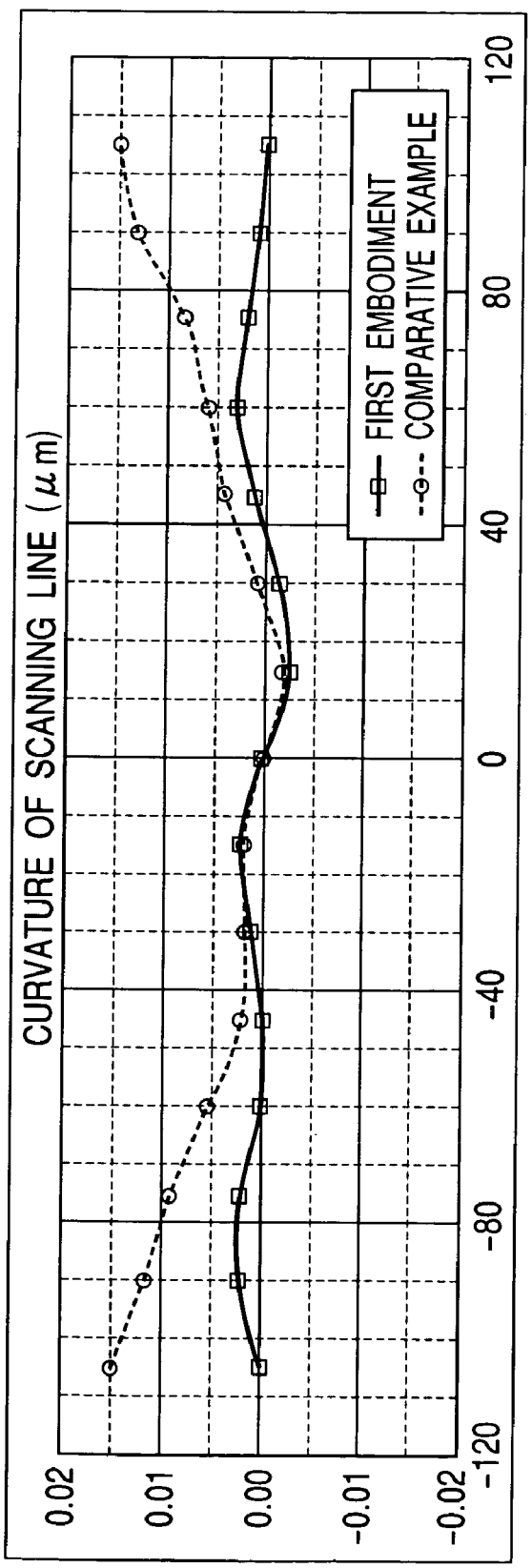

FIGS. 5A to 5C are aberration charts of the first embodiment, respectively. Curvature of field, distortion, and curvature of scanning line are shown from above. Dashes line in the chart of the curvature of scanning line shows a comparative example in which the aspherical component in the sagittal direction of the first embodiment is omitted. It can be understood from those charts that the curvature of scanning line of the first embodiment is preferably corrected, as compared with the comparative example, with curvatures of field in the main scanning direction and the sub-scanning direction, and the distortion (the f-θ characteristic) being kept preferable.

A fabrication method of the scanning optical system 6 will be described.

In the first embodiment, the diffraction grating is cut by a diamond cutter on a aspherical mold formed with high precision, and plastic injection molding is performed using this mold. Easy fabrication can hence be achieved. Further, the aspherical component in the sagittal direction is subjected to the diffraction grating, so that both the meridional line and the sagittal line on the base refractive surface are prevented from being made aspherical. Accordingly, forming, measurement, and estimation can be readily executed.

Figure 6A:
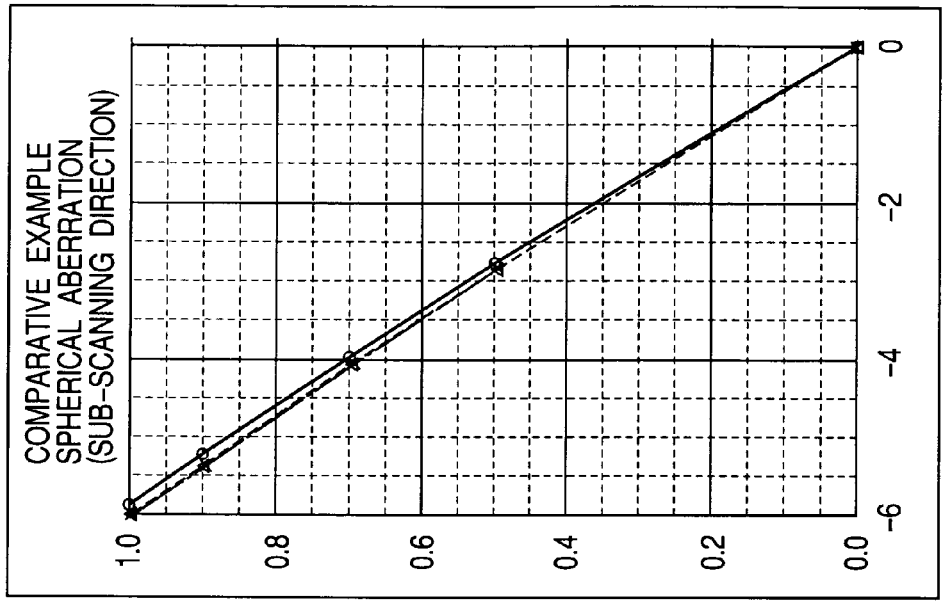
FIGS. 6A and 6B are charts showing spherical aberrations in the sub-scanning direction of the first embodiment and a comparative example, respectively.
Figure 6B:
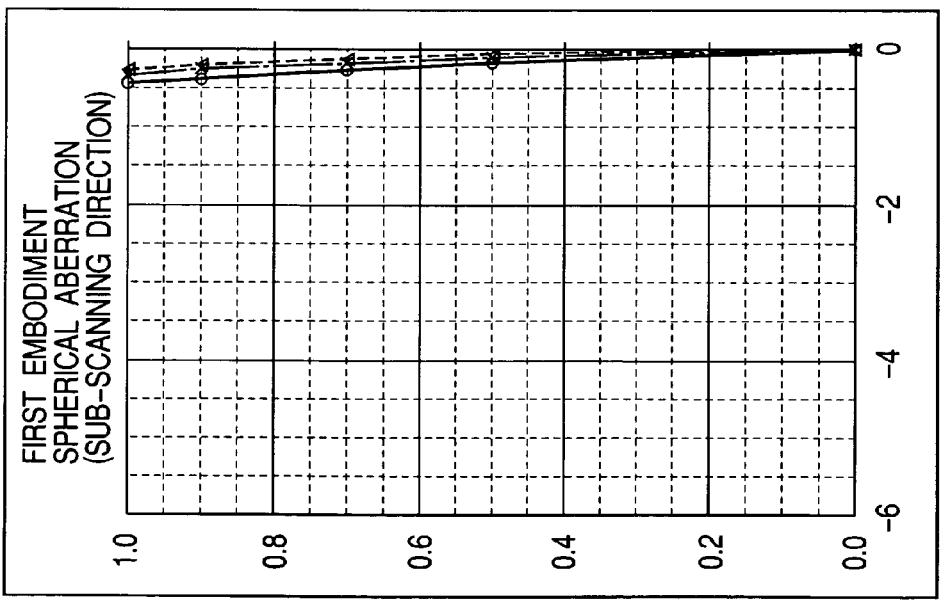

FIGS. 6A and 6B show spherical aberrations in the sub-scanning direction of the first embodiment and a comparative example, respectively. The aspherical component in the sub-scanning direction of the diffraction element added to correct the curvature of the scanning line also has an effect of correcting the spherical aberration in the sub-scanning direction. In FIGS. 6A and 6B, the solid line indicates spherical aberration in the sub-scanning direction on the optical axis in the main scanning direction, dotted line likewise indicates spherical aberration in the sub-scanning direction at a 70-percent location in the main scanning direction, and the alternate long and one short dash line indicates spherical aberration in the sub-scanning direction at a 100-percent image height in the main scanning direction. It can be understood therefrom that the spherical aberration is corrected at every image height in the main scanning direction, as compared with the comparative example in which the aspherical component in the sagittal direction is removed.

In the above-discussed first embodiment, the scanning optical system comprised of a single scanning optical element is used, but the scanning optical system is not limited thereto. For example, the scanning optical system can be comprised of a plurality of scanning optical elements such as a lens, an imaging mirror, and the like. In this case, when the diffraction portion is provided on at least one surface of the scanning optical elements to change the sagittal aspherical quantity, the curvature of the scanning line can be preferably corrected. Further, although a single light beam is scanned in the optical scanning apparatus of the first embodiment, the optical scanning apparatus is not limited thereto. For example, a multi-beam light source having plural radiation points capable of independent modulation can be used, and plural light beams, such as two, three, or four beams, can be simultaneously scanned. Also in the optical scanning apparatus of such a multi-beam type, substantially the same technical advantages as those of the first embodiment can be obtained.

Further, plural (two or more) diffraction surfaces having the aspherical function can be provided. Moreover, the base surface of the diffraction grating is not limited to a refractive surface with power. The base surface of the diffraction grating can be a planar surface without power.

As described in the foregoing, in the first embodiment, the diffraction portion is provided on at least a surface of the scanning optical system 6, and the diffraction portion has an aspherical function (aspherical term) at least in the sagittal direction corresponding to the sub-scanning direction. Accordingly, without using an intricate shape such as a free curved surface, the curvature of the scanning line in the optical scanning apparatus of an oblique-incidence type can also be reduced by a simple and inexpensive method, and an optical scanning apparatus suitable for highly-precise printing can be achieved.

Second Embodiment

Figure 7:
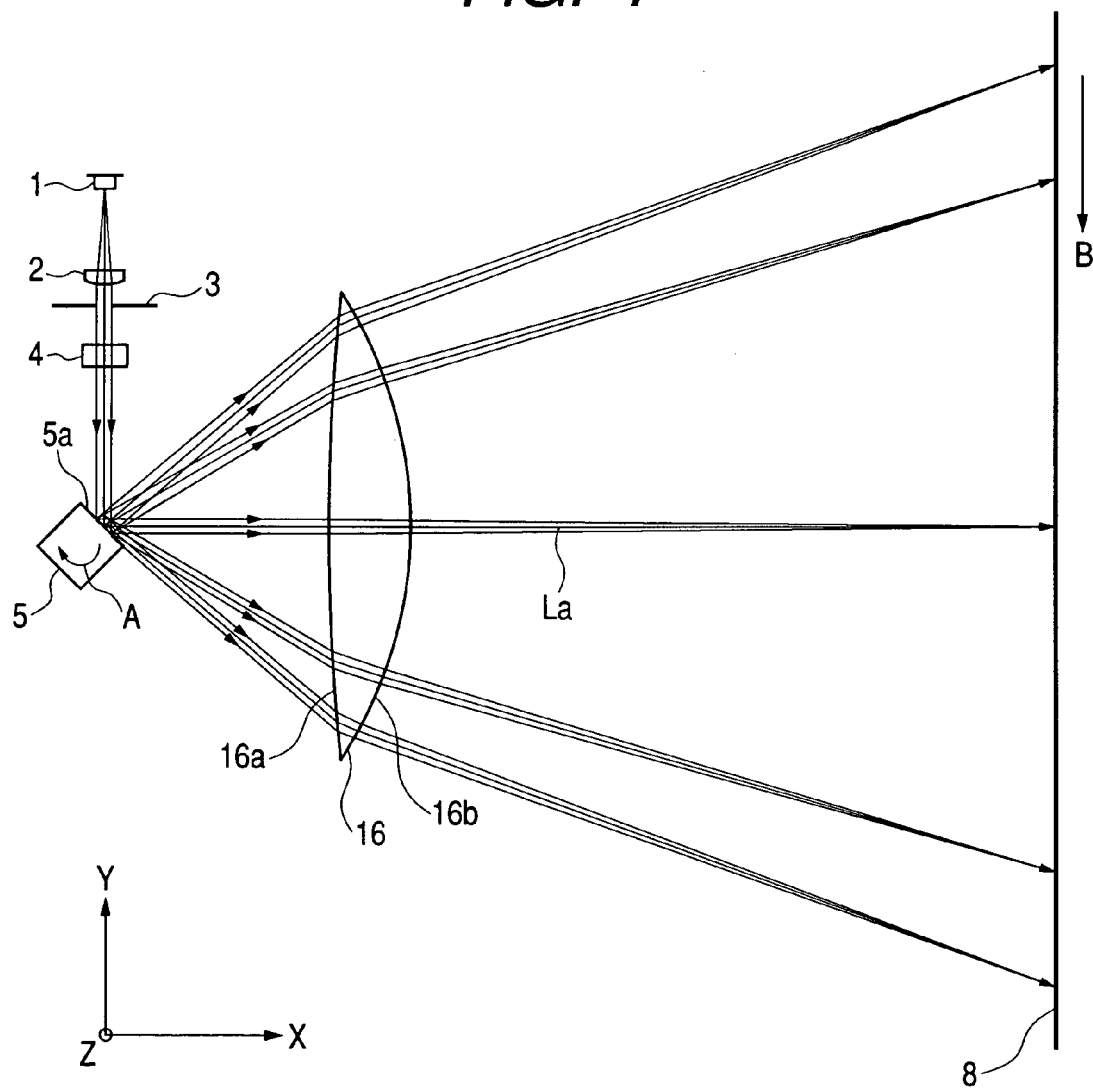
FIG. 7 is a cross-sectional view in a main scanning direction illustrating an optical scanning apparatus of a second embodiment according to the present invention.
Figure 8:
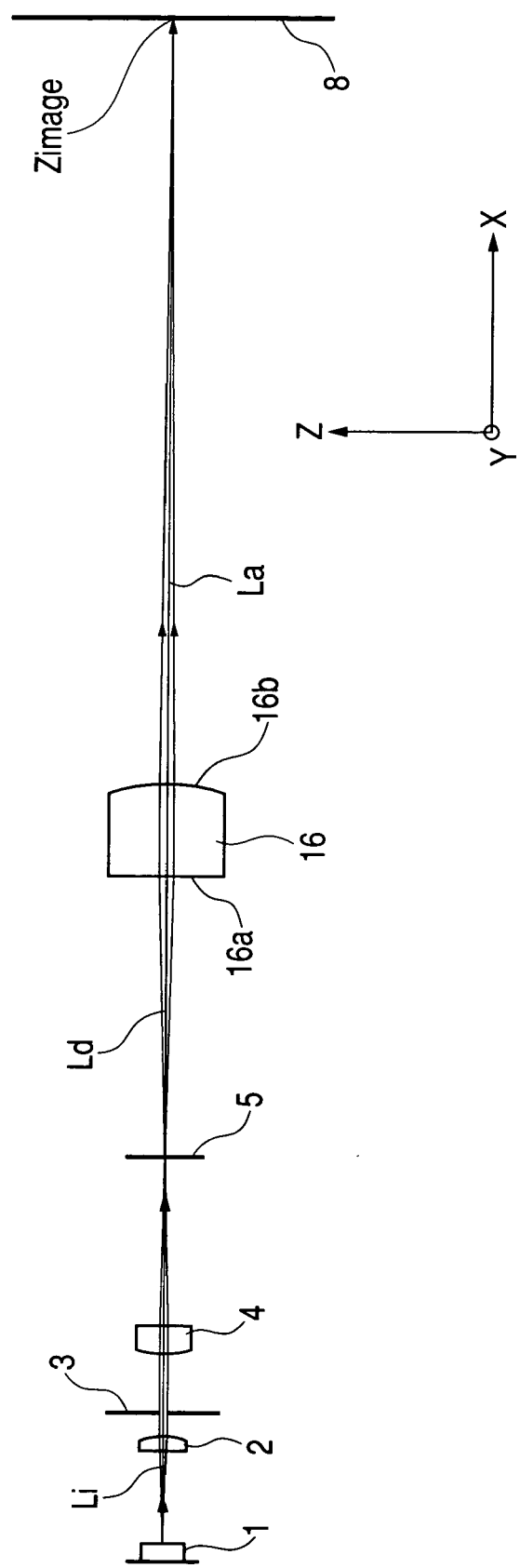
FIG. 8 is a cross-sectional view in a sub-scanning direction of the second embodiment.

FIG. 7 is a cross-sectional view in a main scanning direction illustrating an optical scanning apparatus of a second embodiment according to the present invention, and FIG. 8 is a cross-sectional view in a sub-scanning direction illustrating the second embodiment. The second embodiment is different from the first embodiment in that a light beam is incident on the polygon mirror 5 in a scanning plane or the main scanning section, that aberration in the sub-scanning direction is corrected to reduce the size of a spot, that temperature compensation in the sub-scanning direction is executed using the diffraction portion, and that the optical scanning apparatus is installed in an image forming apparatus. This embodiment is the same as the first embodiment in other points.

Design values of the second embodiment are described in the following Table 2.

TABLE 2

Second embodiment
Design data

| wavelength, refractive index | | | surface shape of toric lens (main scanning direction) | | surface shape of toric lens (sub-scanning direction) | |
|---|---|---|---|---|---|---|
| wavelength used | λ (nm) | 780 | first surface | second surface | first surface | second surface |
| toric lens, refractive index | nd | 1.53064 | R  4.27400E+02 | −9.47135E+01 | r  ∞ | −3.41220E+01 |
| toric lens, Abbe's number | νd | 55.5 | K  3.71366E+00 | | D2s | 8.13408E−05 |
| light beam angle | | | B4  −1.85091E−07 | | D4s | −1.66711E−08 |
| polygon incident angle (main scanning) | αm | 90.0 | B6  3.44576E−11 | | D6s | 1.62053E−11 |
| polygon incident angle (sub-scanning) | γ | 0.0 | B8  −682420E−15 | | D8s | −6.78848E−15 |
| polygon maximum emitting angle | θe | 40.1 | B10  7.10650E−19 | | D10s | 1.06732E−18 |
| arrangement | | | | | D2e | 6.33321E−05 |
| polygon facet-toric lens | e1 | 51.5 | | | D4e | 1.91742E−08 |
| center thickness of toric lens | d1 | 17.9 | | | D6e | −1.57358E−11 |
| toric lens-scanned surface | e2 | 147.3 | Toric lens phase function | | D8e | 6.60864E−15 |
| | | | first surface | second surface | D10e | −1.02302E−18 |
| | | | b2 | | d0 | −3.54219E−03 |
| Suffix s; laser side | | | b4 | | d2 | 1.62700E−07 |
| Suffix e; opposite to laser side | | | b6 | | d4 | |
| | | | b8 | | e0 | 1.23016E−06 |
| | | | b10 | | e2 | −1.79690e−10 |
| | | | | | e4 | |

In the second embodiment, the light beam is incident on the polygon mirror 5 in the scanning plane (the X-Y plane), and the deflected light beam reaches the scanned surface 8 passing the sagittal optical axis La of a scanning optical system 16. Similar to the first embodiment, a light incidence surface 16a of the scanning optical system 16 is shaped into a toric surface whose meridional direction is aspherical, and the diffraction portion (diffraction grating) with an aspherical function (aspherical term) in the sagittal direction is formed on a light emerging surface 16b which is also shaped into a toric surface. The diffraction portion in the second embodiment has power only in the sagittal direction, and its aspherical quantity is changed from that on the optical axis along the meridional direction of the diffraction portion.

In the second embodiment, power in the sagittal direction of the diffraction grating is more strongly set, as compared with the first embodiment. This construction aims at achieving the following purpose by optimizing powers of the refractive portion and the diffraction portion of the scanning optical system 16. At the time when temperature in the overall optical scanning apparatus changes, the above construction makes it possible to offset the focusing change in the sub-scanning direction due to a change in the wavelength of light from the laser by the focusing change in the sub-scanning direction due to a change in the refractive index of material of the plastic scanning optical system 16. Normally, temperature compensation for the focusing in the sub-scanning direction can be achieved by sharing the power within a range written as $$1.0 < \varnothing Ls / \varnothing Ds < 2.6$$

where ØLs is the power in the sub-scanning direction of the refractive portion of the scanning optical system, and ØDs is the power in the sub-scanning direction of the diffraction portion of the scanning optical system.

FIGS. 9A to 9C are aberration charts of the second embodiment, respectively. Curvature of field, distortion, and curvature of scanning line are shown from above. Alternate long and one short dash line in the chart of the curvature of field shows curvature of field in the sub-scanning direction at the time when ambient temperature in the optical scanning apparatus rises by +25° C. It can be understood from those charts that focusing variation at the temperature rising time little occurs with curvatures of field in the main scanning direction and the sub-scanning direction, and the distortion (the f-θ characteristic) being kept preferable.

Figure 10:
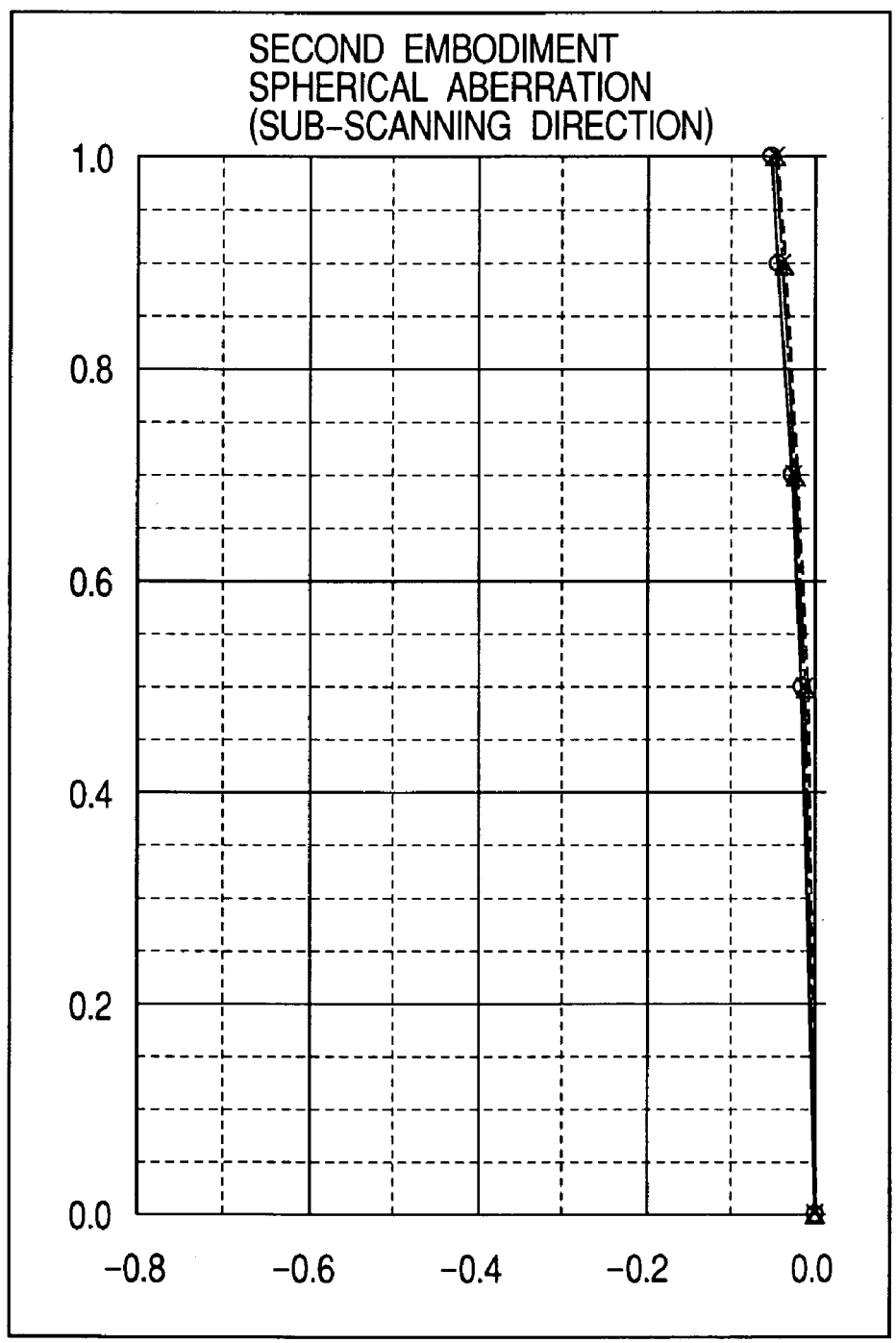
FIG. 10 is a chart showing spherical aberration in the sub-scanning direction of the second embodiment.

In the second embodiment, employing that aspherical effect in the sub-scanning direction, correction of aberrations in the sub-scanning direction of the optical scanning apparatus is performed, and the diameter of a spot on the scanned surface 8 is decreased. FIG. 10 shows the spherical aberration in the sub-scanning direction of the second embodiment. It can be understood therefrom that the spherical aberration is corrected by the aspherical effect of the diffraction element. The spot diameter in the sub-scanning direction can hence be reduced to about 40 μm by that aberration correction. In the second embodiment, no curvature of the scanning line occurs in principle because the light beam is incident on the polygon mirror 5 in the scanning plane.

Image Forming Apparatus

Figure 14:
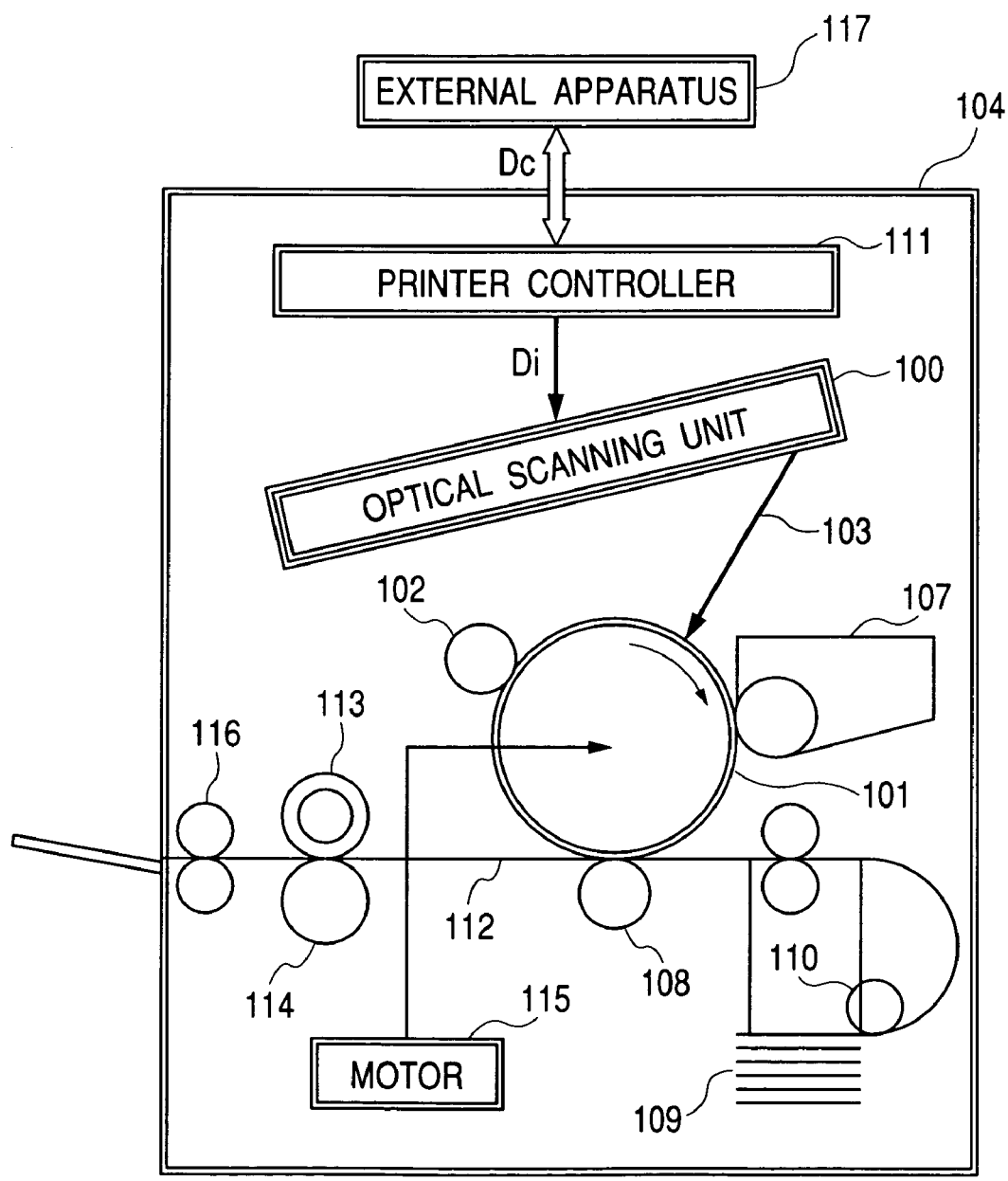
FIG. 14 is a schematic view illustrating a main portion of an embodiment of an image forming apparatus according to the present invention.

FIG. 14 is a cross-sectional view of a main portion along the sub-scanning direction illustrating an embodiment of an image forming apparatus according to the present invention. In FIG. 14, reference numeral 104 designates an image forming apparatus. This image forming apparatus 104 accepts input of code data Dc from an external device 117, such as a personal computer or the like. This code data Dc is converted into image data (dot data) Di by a printer controller 111 in the apparatus 104. This image data Di is supplied to an optical scanning apparatus 100 having the structure as described in either of the above embodiments. This optical scanning apparatus 100 outputs a light beam 103 modulated according to the image data Di, and this light beam 103 scans a photosensitive surface of a photosensitive drum 101 in the main scanning direction.

The photosensitive drum 101 serving as an electrostatic latent image carrier (a photosensitive body) is rotated in a clockwise direction by a motor 115. With the rotation thereof, the photosensitive surface of the photosensitive drum 101 moves in the sub-scanning direction perpendicular to the main scanning direction, relative to the light beam 103. Above the photosensitive drum 101, a charging roller 102 for uniformly charging the surface of the photosensitive drum 101 is disposed so as to contact the surface. Then the surface of the photosensitive drum 101 charged by the charging roller 102 is exposed to the light beam 103 scanned by the optical scanning apparatus 100.

As described previously, the light beam 103 is modulated based on the image data Di, and an electrostatic latent image is formed on the surface of the photosensitive drum 101 under irradiation with the light beam 103. This electrostatic latent image is developed into a toner image by a developing unit 107 disposed so as to contact the photosensitive drum 101 downstream in the rotating direction of the photosensitive drum 101 from the irradiation position of the light beam 103.

The toner image developed by the developing unit 107 is transferred onto a sheet 112 which is a transfer medium, by a transfer roller 108 disposed opposed to the photosensitive drum 101 below the photosensitive drum 101. Sheets 112 are stored in a sheet cassette 109 in front of the photosensitive drum 101, but sheet feed can also be performed by hand feeding. A sheet feed roller 110 is disposed at an end of the sheet cassette 109, and feeds each sheet 112 in the sheet cassette 109 into the conveyance path.

The sheet 112 onto which the toner image not yet fixed is transferred as described above, and is further transferred to a fixing unit located behind the photosensitive drum 101 (i.e., on the left side in FIG. 14). The fixing unit is composed of a fixing roller 113 having a fixing heater (not illustrated) inside and a pressing roller 114 disposed in press contact with the fixing roller 113, and heats while pressing the sheet 112 thus conveyed from the transfer part, in the nip part between the fixing roller 113 and the pressing roller 114, to fix the unfixed toner image on the sheet 112. Sheet discharge rollers 116 are disposed further behind the fixing roller 113 to discharge the fixed sheet 112 to the outside of the image forming apparatus 104.

Although not illustrated in FIG. 14, the print controller 111 also performs control of each section in the image forming apparatus, including the motor 115, and control of the polygon motor, etc., in the optical scanning apparatus 104 described above, in addition to the conversion of data described above.

As described in the foregoing, in the second embodiment, the diffraction portion is provided on at least a surface of the scanning optical system 16, and the diffraction portion has an aspherical function (aspherical term) at least in the sagittal direction corresponding to the sub-scanning direction. Accordingly, the diameter in the sub-scanning direction of a spot on the scanned surface can be reduced by a simple and inexpensive method, and an optical scanning apparatus suitable for highly-precise printing and an image forming apparatus using it can be achieved.

Furthermore, as technical advantage specific to the second embodiment, temperature compensation for the scanning optical system 16 in the sub-scanning direction can be achieved by optimizing powers in the sub-scanning direction of refractive portion and the diffraction portion of the scanning optical system 16. Thus, an optical scanning apparatus and an image forming apparatus using it, which are highly resistant to environmental changes, can be achieved.

Third Embodiment

Figure 11:
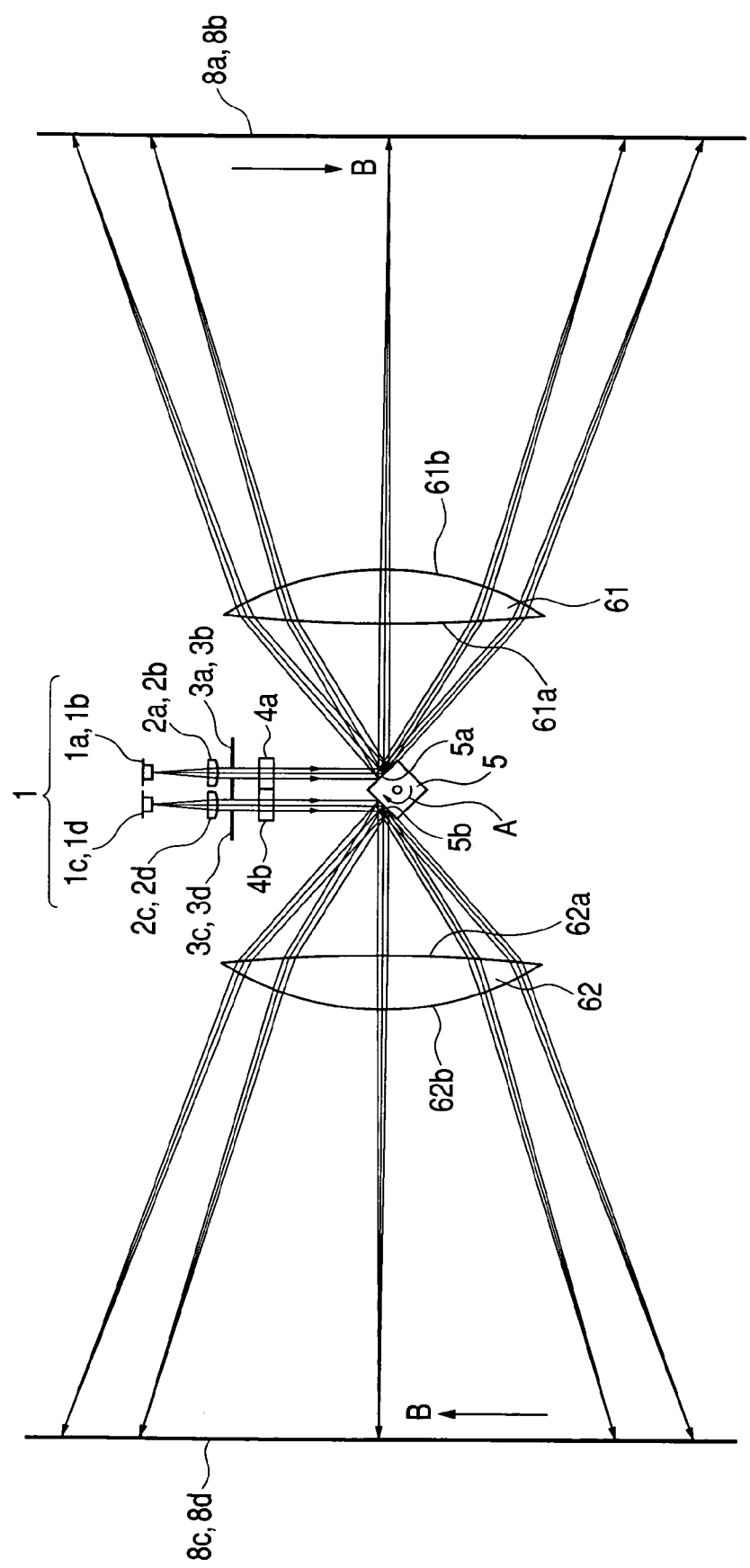
FIG. 11 is a cross-sectional view in a main scanning direction illustrating an optical scanning apparatus of a third embodiment according to the present invention.
Figure 12:
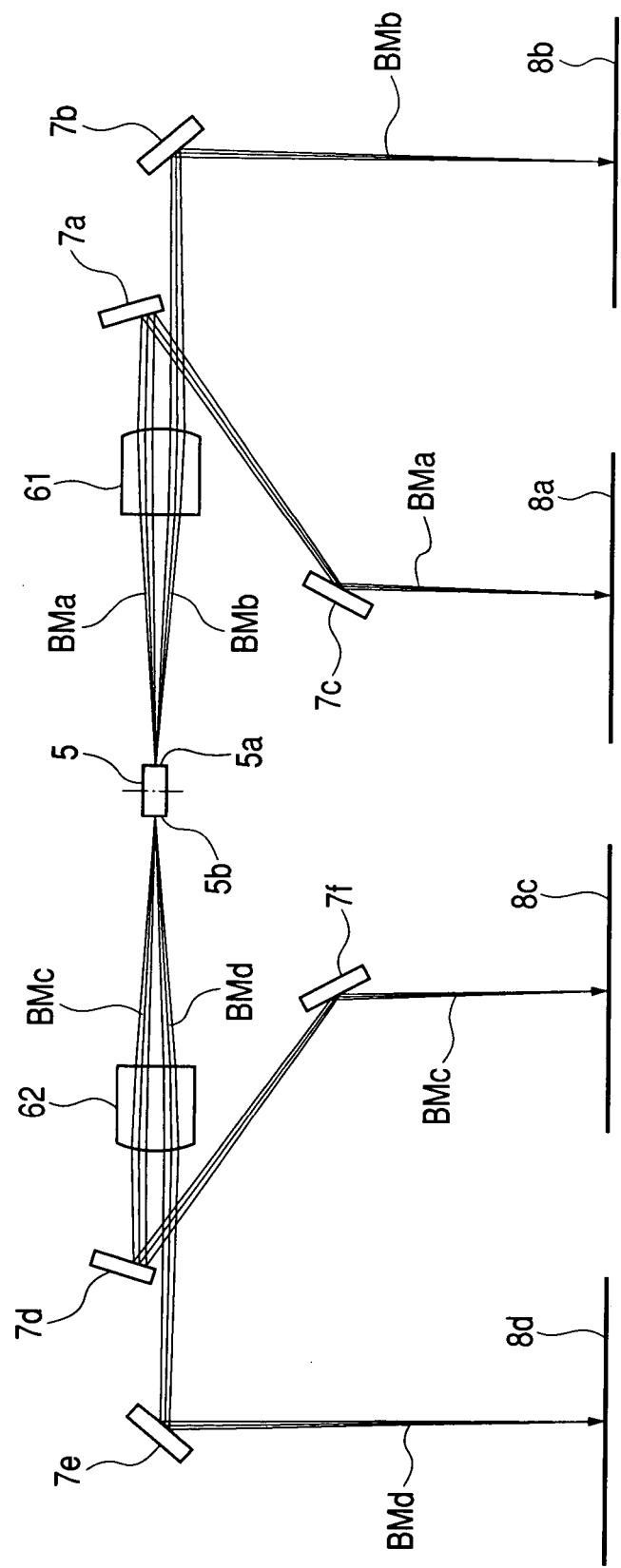
FIG. 12 is a cross-sectional view in a sub-scanning direction of the third embodiment.

FIG. 11 is a cross-sectional view in the main scanning direction illustrating an optical scanning apparatus of a third embodiment according to the present invention, and FIG. 12 is a cross-sectional view in the sub-scanning direction illustrating the third embodiment. The third embodiment is different from the first embodiment in that the diffraction portion of the scanning optical system has powers not only in the sagittal direction but in the meridional direction, that magnification chromatic aberration in the main scanning direction is corrected using those powers, that two scanning optical systems 61 and 62 are opposingly arranged with the deflecting unit being interposed therebetween such that writing can be simultaneously or sequentially performed on four image carriers 8a, 8b, 8c and 8d, and that the optical scanning apparatus is installed in a color image forming apparatus of a tandem type. This embodiment is the same as the first embodiment in other points.

Design values of the third embodiment are described in the following Table 3.

TABLE 3

Third embodiment
Design data

| wavelength, refractive index | | | surface shape of toric lens (main scanning direction) | | surface shape of toric lens (sub-scanning direction) | | |
|---|---|---|---|---|---|---|---|
| wavelength used | λ (nm) | 780 | first surface | second surface | | first surface | second surface |
| toric lens, refractive index | nd | 1.53064 | R 4.64113E+02 | −9.75434+01 | r | ∞ | −3.41646E+01 |
| toric lens, Abbe's number | νd | 55.5 | K 6.01375E+00 | | D2s | | 6.40614E−05 |
| light beam angle | | | B4 −1.66480E−07 | | D4s | | −2.19131E−08 |
| polygon incident angle (main) | αm | 90.0 | B6 3.20799E−11 | | D6s | | 2.00488E−11 |
| polygon incident angle (sub) | γ | 3.0 | B8 −6.80894E−15 | | D8s | | −8.66154E−15 |
| Polygon maximum emitting angle | θe | 40.1 | B10 7.51628E−19 | | D10s | | 1.37699E−18 |
| arrangement | | | | | D2e | | 4.57153E−05 |
| polygon facet-toric lens | e1 | 51.5 | | | D4e | | 1.66824E−08 |
| center thickness of toric lens | d1 | 17.9 | | | D6e | | −1.56813E−11 |
| toric lens-scanned surface | e2 | 147.3 | Toric lens phase function | | D8e | | 6.59327E−15 |
| | | | first surface | second surface | D10e | | −1.01836E−18 |
| | | | b2 | −1.25388E−04 | d0 | | −3.55223E−03 |
| Suffix s; laser side | | | b4 | | d2 | | 2.68466E−07 |
| Suffix e; opposite to laser side | | | b6 | | d4 | | |
| | | | b8 | | e0 | | 1.28366E−06 |
| | | | b10 | | e2 | | −1.06042E−10 |
| | | | | | e4 | | |

In the optical scanning apparatus of the third embodiment, two scanning optical systems 61 and 62 are disposed, the deflecting unit 5 is interposed between these scanning optical systems 61 and 62, two light beams are incident on the scanning optical systems 61 and 62, respectively, four light beams BMa, BMb, BMc and BMd are simultaneously deflected by a single deflecting unit 5, and these four deflected beams are scanned on surfaces 8a, 8b, 8c and 8d (scanned surfaces) of corresponding photosensitive drums, respectively.

In FIGS. 11 and 12, reference numeral 1 designates a light source unit (a multi-beam laser) which is comprised of four semiconductor lasers 1a, 1b, 1c and 1d for emitting a light beam. Four divergent light beams emitted from four semiconductor lasers 1a, 1b, 1c and 1d are converted into nearly parallel light beams (these beams can be convergent light beams, or divergent light beams) by corresponding collimator lenses (a first optical element) 2a, 2b, 2c and 2d, and widths of the nearly parallel light beams are limited by corresponding aperture stops 3a, 3b, 3c and 3d. Two nearly parallel light beams passing through the aperture stops 3a and 3b are then incident on a first cylindrical lens (a second optical element) 4a having power only in the sub-scanning direction, and are imaged as images elongate in the main scanning section on places near a deflection facet 5a (later described) of the deflecting unit 5. Remaining two nearly parallel light beams passing through the aperture stops 3c and 3d are incident on a second cylindrical lens (a second optical element) 4b having power only in the sub-scanning direction, and are imaged as images elongate in the main scanning section on places near a deflection facet 5b (later described) of the deflecting unit 5.

Reference numeral 5 designates a deflecting unit comprised of, for example, a four-facet rotatable polygon mirror which is rotated at a constant angular velocity in a direction of an arrow A by a driving unit (not shown) such as a motor.

Reference numeral 61 designates a first scanning optical system comprised of a single scanning optical system (a f-θ lens) having the f-θ characteristic and formed by plastic molding. Reference numeral 62 designates a second scanning optical system comprised of a single scanning optical system (a f-θ lens) having the f-θ characteristic and formed by plastic molding. Each of the first and second scanning optical systems 61 and 62 images two light beams BMa and BMb (or BMc and BMd) on the photosensitive drums 8a and 8b (or 8c and 8d) which serve as the scanned surface, and has a function of correcting the fall of the deflection facet 5a (or 5b) of the deflecting unit 5.

Four light beams BMa, BMb, BMc and BMd reflectively deflected by the deflection facets 5a and 5b of the deflecting unit 5 are transmitted through the first and second scanning optical systems 61 and 62, and are guided onto corresponding photosensitive drum surfaces 8a, 8b, 8c and 8d. Those four light beams are scanned in a direction of arrows B on the photosensitive drums 8a, 8b, 8c and 8d by rotating the polygon mirror 5 in the direction of arrow A. Each one scanning line is thus formed on each of four photosensitive drums 8a, 8b, 8c and 8d, and image recording is performed.

The third embodiment illustrates an example of a color image forming apparatus which includes four photosensitive drums corresponding to colors of Y (yellow), M (magenta), C (cyan) and Bk (black). The color image is formed by superimposition of those four colors. If printing positions of scanning lines corresponding to those colors deviate from each other, chromatic deviation appears, and image degradation hence occurs. Therefore, printing positions of scanning lines corresponding to those colors need to be aligned with each other.

In the optical scanning apparatus of the third embodiment as illustrated in FIG. 12, two scanning optical systems 61 and 62 are used for a single polygon mirror 5 such that four light beams can be simultaneously scanned, and the deflected light beams BMa and BMc incident on places above the sagittal optical axes of the scanning optical systems 61 and 62 are folded downward at positions near the scanning optical systems 61 and 62 by first and second folding mirrors 7a and 7d, and are reflected by third and fourth folding mirrors 7c and 7f toward the photosensitive drum surfaces 8a and 8c, respectively. The deflected light beams BMb and BMd incident on places below the sagittal optical axes of the scanning optical systems 61 and 62 are reflected by fifth and sixth folding mirrors 7b and 7e toward the photosensitive drum surfaces 8b and 8d at positions away from the scanning optical systems 61 and 62, respectively.

As discussed above, the folding mirrors are arranged in an approximately line symmetrical fashion with respect to the rotation axis of the polygon mirror 5. A compact optical scanning apparatus with a simple structure can hence be achieved.

Generally, where folding mirrors are arranged in a line symmetrical fashion with respect to the rotation axis of the polygon mirror as in the third embodiment, directions of curvatures of scanning lines formed by scanning surfaces of respective photosensitive drums are inverted. Accordingly, the problem of chromatic deviation is likely to noticeably occur if an optical scanning apparatus with a largely-curved scanning line is used. Further, where the arrangement of the folding mirrors in the third embodiment is inverted such that the deflected light beam incident on a place below the sagittal optical axis of the second scanning optical system 62 is guided to the photosensitive drum surface 8 using an even number of folding mirrors, and the light beam incident on a place above the sagittal optical axis is guided to the photosensitive drum surface 8 using an odd number of folding mirrors, the spread of the optical path is liable to be intricate though directions of curvatures of the scanning lines can be aligned. Accordingly, the size of the optical scanning apparatus, the number of folding mirrors, and the cost are likely to increase.

Therefore, in the optical scanning apparatus of the third embodiment, similar to the first embodiment, light incidence surfaces 61a and 62a of the scanning optical elements 61 and 62 in the scanning optical systems are shaped into toric surfaces whose meridional directions are aspherical, respectively, and diffraction portions with an aspherical function (aspherical term) in the sagittal direction are formed on light emerging surfaces 61b and 62b which are also shaped into toric surfaces, respectively. The diffraction grating in the third embodiment has powers in both the meridional direction and the sagittal direction, and the aspherical quantity changes from that on the optical axis La along the meridional direction of the element.

The power for directing downward the deflected light beam transmitted through the scanning optical systems 61 and 62 can be varied by the aspherical component of the diffraction grating, and hence the irradiation positions on the scanned surfaces 8a to 8d can be controlled. Further, the irradiation positions Zo for respective image heights can be aligned with each other by changing the aspherical quantity along the meridional direction. In other words, the curvature of the scanning line can be corrected.

Further, the diffraction grating in the third embodiment has power in the main scanning direction such that magnification chromatic aberration generated in the scanning optical systems 61 and 62 can be reduced. Normally, the wavelength of a semiconductor laser accompanies variation of about ±10 nm due to its fabrication error. In the third embodiment, even if a light source having such variation is used for the scanning optical system corresponding to the four color light, the design is established such that image positions (magnification) in the main scanning direction can be aligned with each other. Hence, no chromatic deviation occurs.

Figure 13A:
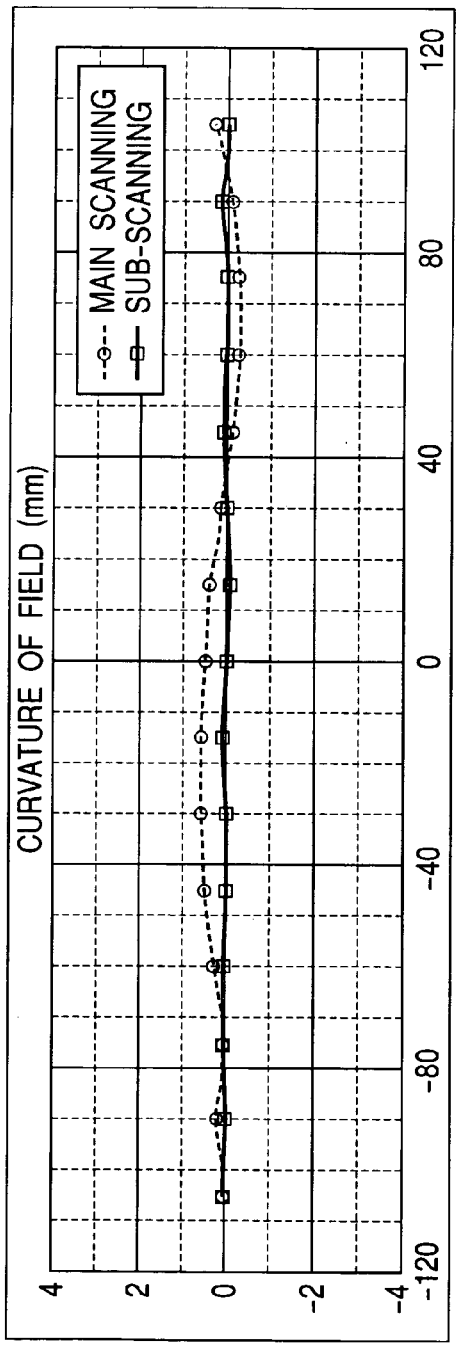
FIGS. 13A, 13B and 13C are charts showing geometrical aberrations of the third embodiment, respectively.
Figure 13B:
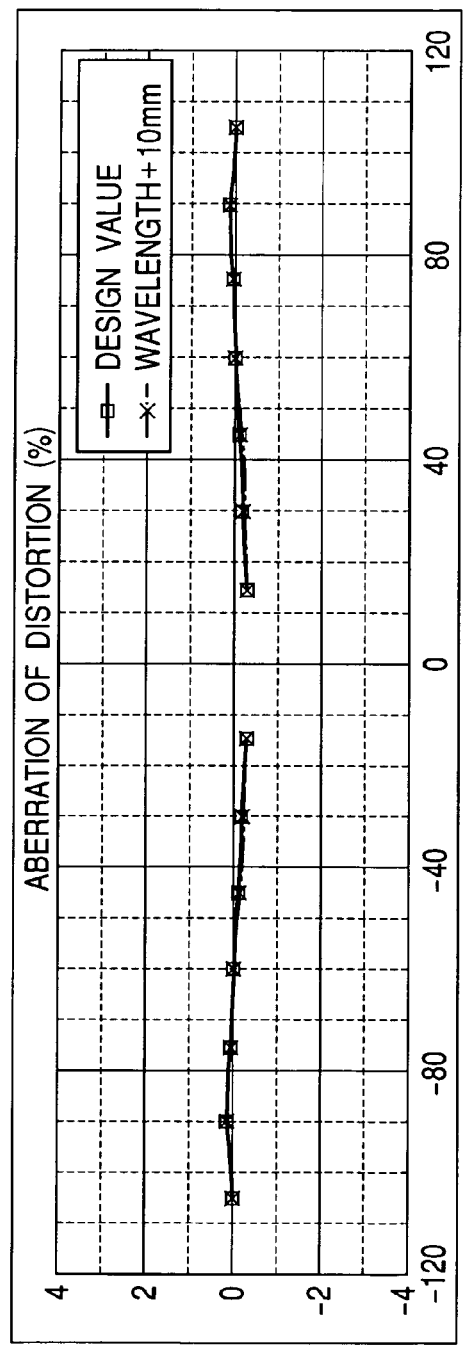
Figure 13C:
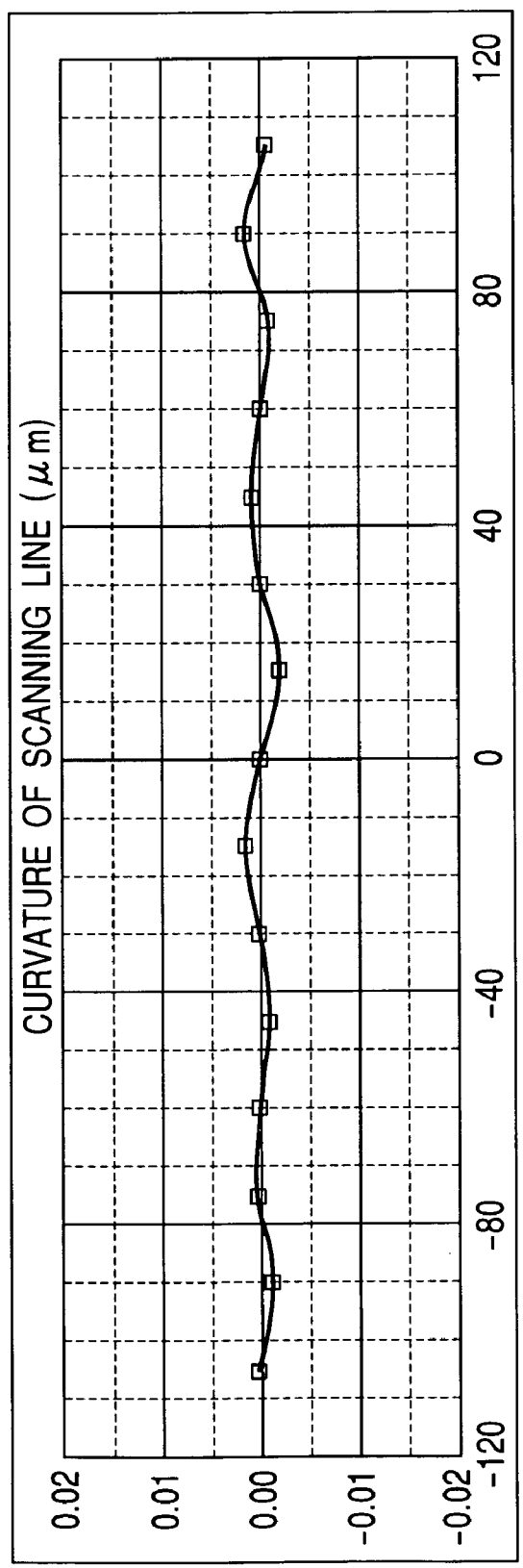

FIGS. 13A to 13C are aberration charts of the third embodiment, respectively. Curvature of field, distortion, and curvature of scanning line are shown from above. Dotted line in the chart of the distortion shows distortion at the time when the wavelength is changed +10 nm from a reference wavelength. This dotted line exhibits that any change in the distortion due to the change in the wavelength does not appear, i.e., magnification chromatic aberration is corrected. It can be understood from those charts that the curvature of the scanning line is preferably corrected as well due to the sagittal aspherical effect given by the diffraction grating.

In the above-discussed third embodiment, the scanning optical system comprised of a single scanning optical element is used, but the scanning optical system is not limited thereto. For example, the scanning optical system can be comprised of a plurality of scanning optical with the same effect. Further, a single light beam is scanned on the photosensitive drum corresponding to each color, but the following construction is also applicable with the same effect, for example. Eight light beams are simultaneously reflectively deflected by the polygon mirror, four light beams are guided to each of two scanning optical systems, and two light beams are scanned on each photosensitive drum.

Color Image Forming Apparatus

Figure 15:
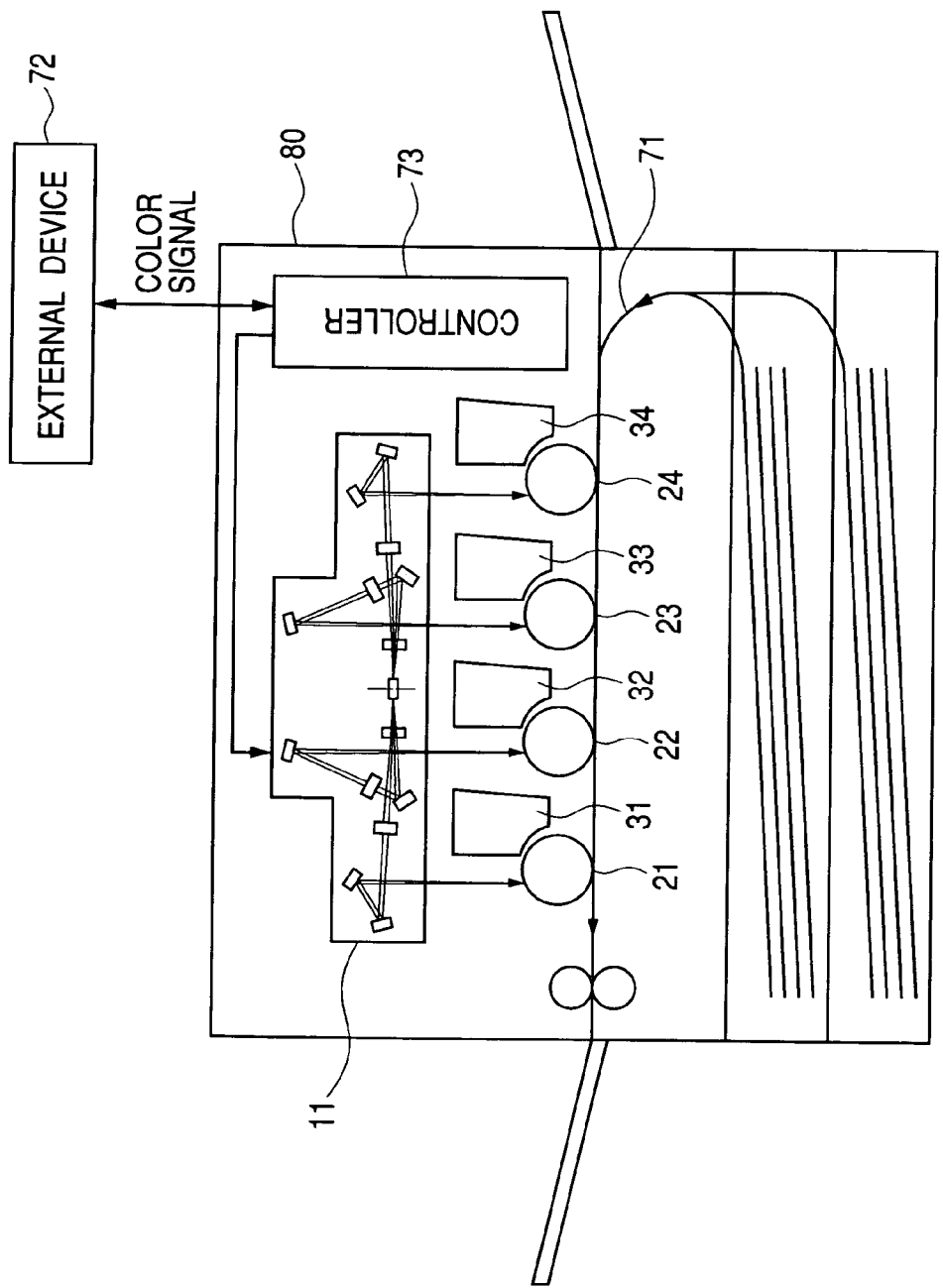
FIG. 15 is a cross-sectional view illustrating a main portion of an embodiment of a color image forming apparatus according to the present invention.
Figure 16:
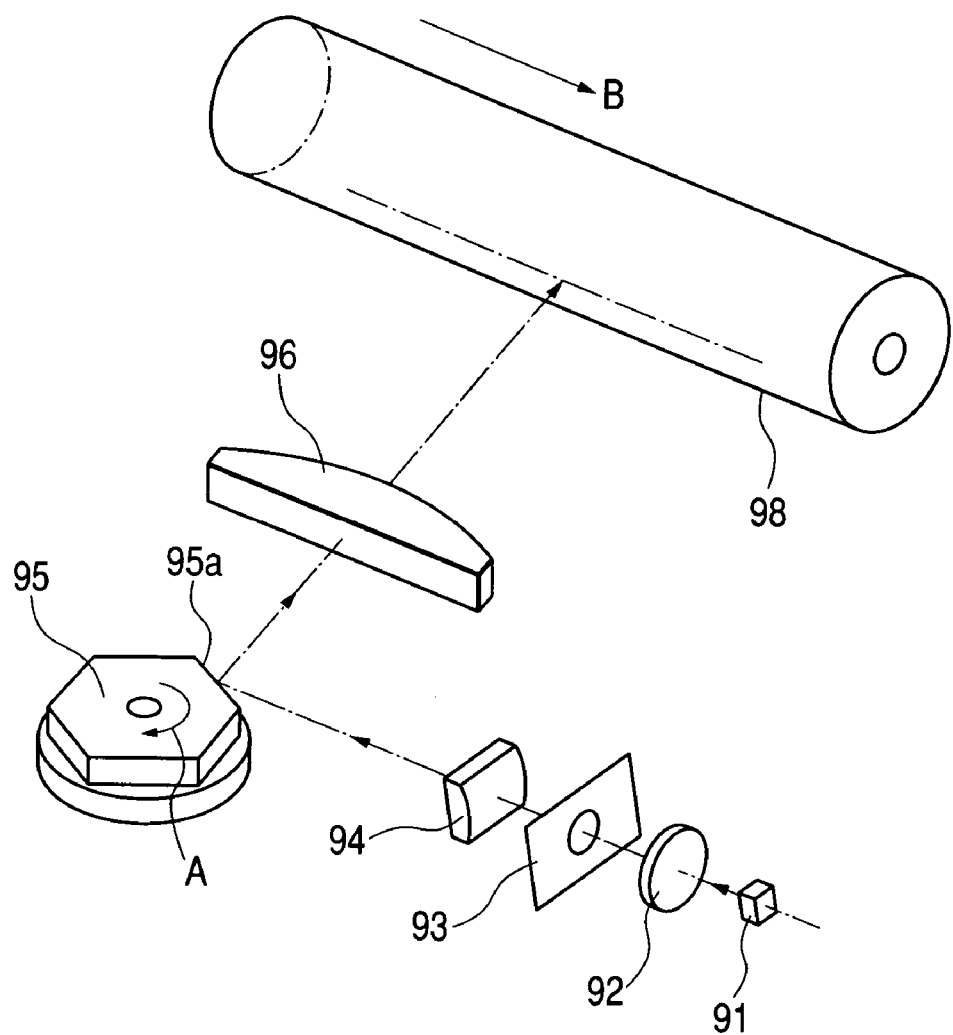
FIG. 16 is a perspective view illustrating a conventional optical scanning apparatus.

FIG. 15 is a schematic view illustrating a main portion of a color image forming apparatus of the present invention. This embodiment is directed to a color image forming apparatus of a tandem type in which image information is recorded on a photosensitive drum serving as an image carrier. In FIG. 15, reference numeral 80 represents a color image forming apparatus. Reference numeral 11 represents an optical scanning apparatus. Reference numerals 21, 22, 23 and 24 represent photosensitive drums serving as image carrier, respectively. Reference numerals 31, 32, 33 and 34 represent developing units, respectively. Reference numeral 71 represents a conveyance belt. In FIG. 18, there are also arranged a transfer unit for transferring a toner image developed by the developing unit onto a transfer medium, and a fixing unit for fixing the transferred toner image on the transfer medium, though these are not illustrated.

In FIG. 15, the color image forming apparatus 80 accepts input of color signals of R (red), G (green) and B (blue) from an external device 72 such as a personal computer. Those color signals are converted into image data (dot data) of C (cyan), M (magenta), Y (yellow), and Bk (black) by a printer controller 73 in the apparatus. The image data is supplied to the optical scanning apparatus 11. This optical scanning apparatus 11 outputs a light beam modulated according to each image data, and these light beams scan photosensitive surfaces of a photosensitive drums 21, 22, 23 and 24 in the main scanning direction, respectively.

In the color image forming apparatus of this embodiment, latent images of respective colors are formed on corresponding photosensitive drums 21, 22, 23 and 24 by the optical scanning apparatus 11 using light beams based on the respective image data. After that, the latent images are multi-transferred onto a recording medium, and a full-color picture is thus formed.

As described in the foregoing, in the third embodiment, the diffraction portion is provided on at least a surface of the scanning optical system, and the diffraction portion has an aspherical function (aspherical term) at least in the sagittal direction corresponding to the sub-scanning direction. Accordingly, the curvature of the scanning line in the optical scanning apparatus of an oblique-incidence type can also be reduced by a simple and inexpensive method, and an optical scanning apparatus suitable for highly-precise printing and an image forming apparatus using it can be achieved.

Furthermore, as technical advantage specific to the third embodiment, magnification chromatic aberration in the optical scanning apparatus can be reduced by causing the diffraction element to have powers not only in the sub-scanning direction but in the main scanning direction. Thus, an optical scanning apparatus with a small chromatic deviation and an image forming apparatus using it can be achieved.

According to the present invention, as described in the foregoing, the diffraction portion is provided on at least a surface of the scanning optical system, and the diffraction portion has an aspherical function at least in the sagittal direction corresponding to the sub-scanning direction, as described above. Accordingly, there can be achieved an optical scanning apparatus and an image forming apparatus using it, in which reduction of the curvature of the scanning line and decrease in the spot diameter in the sub-scanning direction can be effected by an easy and simple method, and which are suitably applicable to highly-precise printing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical scanning apparatus comprising:
   light source means;
   deflecting means for deflecting and scanning a light beam from said light source means; and
   a scanning optical system for imaging the light beam deflected by said deflecting means on a surface to be scanned, said scanning optical system including a diffraction portion having an aspherical function in a sub-scanning direction,
   wherein the aspherical function of said diffraction portion of said scanning optical system in the sub-scanning direction is continuously changed from an on-axis position to an off-axis position along a main scanning direction.

2. An optical scanning apparatus according to claim 1, wherein said scanning optical system comprises a single scanning optical element.

3. An optical scanning apparatus according to claim 1, wherein said scanning optical system has a function of performing temperature compensation in the sub-scanning direction on an optical axis.

4. An optical scanning apparatus according to claim 1, wherein said light source means includes a plurality of radiation points which can be independently modulated.

5. An optical scanning apparatus according to claim 1, wherein said deflecting means and said surface to be scanned are arranged in a conjugate or approximately conjugate relationship with each other in a sub-scanning section.

6. An image forming apparatus comprising:
   an optical scanning apparatus recited in claim 1;
   a photosensitive body placed at said surface to be scanned;
   developing means for developing an electrostatic latent image, which is formed on said photosensitive body by the light beam scanned by said optical scanning apparatus, as a toner image;
   transferring means for transferring the developed toner image onto a transfer medium; and
   fixing means for fixing the transferred toner image on the transfer medium.

7. A color image forming apparatus comprising:
   at least an optical scanning apparatus recited in claim 1;
   a plurality of a photosensitive bodies placed at said surface to be scanned;
   a plurality of developing means for developing an electrostatic latent image, which is formed on said photosensitive body by the light beam scanned by said optical scanning apparatus, as a toner image;
   transferring means for transferring the developed toner image onto a transfer medium; and
   fixing means for fixing the transferred toner image on the transfer medium.

8. An image forming apparatus comprising:
   an optical scanning apparatus recited in claim 1; and
   a printer controller for converting code data input from an external apparatus into image signal to supply the image signal to said optical scanning apparatus.

9. An optical scanning apparatus comprising:
   light source means;
   deflecting means for deflecting and scanning a light beam from said light source means, the light beam from said light source means being incident on a deflection facet of said deflecting means at an angle relative to said deflection facet in a sub-scanning section; and a scanning optical system for imaging the light beam deflected by said deflecting means on a surface to be scanned, said scanning optical system including a diffraction portion having an aspherical function in a sub-scanning direction, wherein the aspherical function of said diffraction portion of said scanning optical system in the sub-scanning direction is continuously changed from an on-axis position to an off-axis position along a main scanning direction.

10. An optical scanning apparatus according to claim 9, wherein said scanning optical system comprises a single scanning optical element.

11. An optical scanning apparatus according to claim 9, wherein said scanning optical system has a function of performing temperature compensation in the sub-scanning direction on an optical axis.

12. An optical scanning apparatus according to claim 9, wherein said light source means includes a plurality of radiation points which can be independently modulated.

13. An optical scanning apparatus according to claim 9, wherein curvature of a scanning line on said surface to be scanned, which occurs by causing the light beam to be incident on said deflection facet at an angle relative to said deflection facet in a sub-scanning section, is corrected in said scanning optical system.

14. An optical scanning apparatus according to claim 9, wherein said deflecting means and said surface to be scanned are arranged in a conjugate or approximately conjugate relationship with each other in a sub-scanning section.

15. An image forming apparatus comprising:

an optical scanning apparatus recited in claim 9;

a photosensitive body placed at said surface to be scanned;

developing means for developing an electrostatic latent image, which is formed on said photosensitive body by the light beam scanned by said optical scanning apparatus, as a toner image;

transferring means for transferring the developed toner image onto a transfer medium; and fixing means for fixing the transferred toner image on the transfer medium.

16. A color image forming apparatus comprising:

at least an optical scanning apparatus recited in claim 9;

a plurality of a photosensitive bodies placed at said surface to be scanned;

a plurality of developing means for developing an electrostatic latent image, which is formed on said photosensitive body by the light beam scanned by said optical scanning apparatus, as a toner image;

transferring means for transferring the developed toner image onto a transfer medium; and fixing means for fixing the transferred toner image on the transfer medium.

17. An image forming apparatus comprising:

an optical scanning apparatus recited in claim 9; and a printer controller for converting code data input from an external apparatus into image signal to supply the image signal to said optical scanning apparatus.

* * * * *

UNITED STATES PATENT AND TRADEMARK OFFICE
CERTIFICATE OF CORRECTION

PATENT NO. : 7,053,922 B2
APPLICATION NO. : 10/631781
DATED : May 30, 2006
INVENTOR(S) : Manabu Kato et al.

It is certified that error appears in the above-identified patent and that said Letters Patent is hereby corrected as shown below:

COLUMN 3
    Line 30, the second occurrence of "a" should be deleted.

COLUMN 4
    Line 6, the second occurrence of "a" should be deleted; and
    Line 39, "optical.path" should read --optical path--.

COLUMN 6
    Lines 17-18,
"$Xa = (Y^2 / R) / \{1 + (1 - (1 + K)(Y/R)^2)^{1/2}\} + B_4 Y^4 + B_6 Y^4 + B_8 Y^8 + B_{10} Y^{10}$" should read -- $Xa = (Y^2 / R) / \{1 + (1 - (1 + K)(Y/R)^2)^{1/2}\} + B_4 Y^4 + B_6 Y^6 + B_8 Y^8 + B_{10} Y^{10}$ --; and
    Line 36, "radius" should read --, Rs is the radius--.

COLUMN 7
    Table 1, last column, last nuimber, "-3.290990E-20" should read -- -3.20990E-20--; and
    Table 1, first column, second to last line, "opposire" should read --opposite--.

COLUMN 11
    Table 2, fourth column, third umber, "-682420E-15" should read -- -6.82420E-15--.

COLUMN 18
    Line 53, "optical" should read --optical elements--.

COLUMN 20
    Line 48, the second occurrence of "a" should be deleted; and
    Line 61, "image" should read --an image--.

UNITED STATES PATENT AND TRADEMARK OFFICE
CERTIFICATE OF CORRECTION

PATENT NO.       : 7,053,922 B2
APPLICATION NO.  : 10/631781
DATED            : May 30, 2006
INVENTOR(S)      : Manabu Kato et al.

It is certified that error appears in the above-identified patent and that said Letters Patent is hereby corrected as shown below:

COLUMN 22
Line 15, the second occurrence of "a" should be deleted; and
Line 29, "image" should read --an image--.

Signed and Sealed this

Twenty-sixth Day of December, 2006

JON W. DUDAS
*Director of the United States Patent and Trademark Office*